US010469767B2

(12) United States Patent
Shikata

(10) Patent No.: US 10,469,767 B2
(45) Date of Patent: Nov. 5, 2019

(54) INFORMATION PROCESSING APPARATUS, METHOD, AND NON-TRANSITORY COMPUTER-READABLE MEDIUM

(71) Applicant: SONY CORPORATION, Tokyo (JP)

(72) Inventor: Yasuhito Shikata, Tokyo (JP)

(73) Assignee: SONY CORPORATION, Tokyo (JP)

( * ) Notice: Subject to any disclaimer, the term of this patent is extended or adjusted under 35 U.S.C. 154(b) by 370 days.

(21) Appl. No.: 14/350,471

(22) PCT Filed: Oct. 19, 2012

(86) PCT No.: PCT/JP2012/006710
§ 371 (c)(1),
(2) Date: Apr. 8, 2014

(87) PCT Pub. No.: WO2013/073107
PCT Pub. Date: May 23, 2013

(65) Prior Publication Data
US 2014/0253693 A1 Sep. 11, 2014

(30) Foreign Application Priority Data
Nov. 14, 2011 (JP) ................................ 2011-248264

(51) Int. Cl.
*H04N 5/262* (2006.01)
*H04N 1/21* (2006.01)
(Continued)

(52) U.S. Cl.
CPC ......... *H04N 5/2628* (2013.01); *H04N 1/2112* (2013.01); *H04N 5/23241* (2013.01); *H04N 5/23245* (2013.01); *H04N 5/23293* (2013.01); *H04N 5/23296* (2013.01); *H04N 5/247* (2013.01); *H04N 5/45* (2013.01);
(Continued)

(58) Field of Classification Search
CPC .... H04N 5/23293; H04N 5/45; G06F 3/0488; G06F 3/04845
See application file for complete search history.

(56) References Cited

U.S. PATENT DOCUMENTS 5,754,230 A 5/1998 Tsuruta
6,069,669 A * 5/2000 Park ......................... G09G 5/14
345/536

(Continued)

FOREIGN PATENT DOCUMENTS

DE 31 46 552 A1 7/1983
JP 2000-261829 A 9/2000

OTHER PUBLICATIONS

International Search Report dated Feb. 25, 2013 in PCT/JP2012/006710.

*Primary Examiner* — Rebecca A Volentine
(74) *Attorney, Agent, or Firm* — Oblon, McClelland, Maier & Neustadt, L.L.P.

(57) ABSTRACT

An information processing apparatus that acquires first image data captured by a first image capturing unit; acquires second image data captured by a second image capturing unit; controls a display to operate in a first mode in which the first and second images are simultaneously displayed; controls the display to operate in a second mode in which a relationship of the second image with the first image is indicated; and selects between the first and second modes based on a predetermined condition.

24 Claims, 26 Drawing Sheets

(51) Int. Cl.

| | |
|---|---|
| ***H04N 5/232*** | (2006.01) |
| ***H04N 5/247*** | (2006.01) |
| ***H04N 5/45*** | (2011.01) |
| ***H04N 13/356*** | (2018.01) |
| ***H04N 13/296*** | (2018.01) |
| ***H04N 13/286*** | (2018.01) |
| ***H04N 1/00*** | (2006.01) |

(52) U.S. Cl.

CPC ......... *H04N 13/286* (2018.05); *H04N 13/296* (2018.05); *H04N 13/356* (2018.05); *H04N 1/00442* (2013.01)

(56) References Cited

U.S. PATENT DOCUMENTS 6,639,626 B1 * 10/2003 Kubo .................. H04N 5/2258 348/218.1
7,123,155 B2 * 10/2006 Schinner ............ G01R 31/3648 320/132
2002/0075407 A1 6/2002 Cohen-Solal
2002/0140862 A1 10/2002 Dimitrova et al.
2002/0152557 A1 10/2002 Elberbaum
2003/0160886 A1 8/2003 Misawa et al.
2007/0064141 A1 3/2007 Misawa et al.
2007/0064142 A1 3/2007 Misawa et al.
2007/0101287 A1 5/2007 Pagan
2007/0103577 A1 5/2007 Misawa et al.
2008/0084493 A1 4/2008 Ochi
2009/0201424 A1 8/2009 Ueda
2010/0026721 A1 * 2/2010 Park ...................... G06F 3/0481 345/660
2010/0079671 A1 * 4/2010 Vanduyn ............... G06F 3/0481 348/565
2010/0188579 A1 * 7/2010 Friedman ................. H04N 5/45 348/565
2010/0283860 A1 * 11/2010 Nader ................... G06F 1/1626 348/222.1
2010/0321533 A1 * 12/2010 Park ...................... G06F 3/0481 348/239
2011/0018970 A1 1/2011 Wakabayashi
2011/0050963 A1 3/2011 Watabe
2011/0157404 A1 6/2011 Shiohara
2011/0181911 A1 * 7/2011 Kojima ................... G06T 11/60 358/1.15
2011/0211041 A1 9/2011 Maeda et al.
2011/0212715 A1 * 9/2011 Lam ...................... G06F 1/3203 455/418
2011/0234853 A1 * 9/2011 Hayashi ................. G03B 13/02 348/231.99
2011/0234881 A1 * 9/2011 Wakabayashi ....... H04N 5/2251 348/333.05
2011/0242099 A1 10/2011 Arai et al.
2011/0242369 A1 10/2011 Misawa et al.
2011/0249073 A1 * 10/2011 Cranfill .................. H04N 7/147 348/14.02
2011/0249076 A1 * 10/2011 Zhou ...................... H04N 7/147 348/14.02
2011/0268425 A1 11/2011 Glen
2011/0304697 A1 * 12/2011 Kim ................... H04N 5/23293 348/47
2012/0019563 A1 * 1/2012 Misawa .............. G06F 3/04845 345/661
2012/0092529 A1 * 4/2012 Choi .................. H04N 5/23219 348/239
2012/0105579 A1 * 5/2012 Jeon ..................... H04N 5/2258 348/38
2012/0113216 A1 * 5/2012 Seen .................. H04N 5/23293 348/38
2014/0262462 A1 * 9/2014 Shah .................... H05K 3/4007 174/257

* cited by examiner

[Fig. 1]
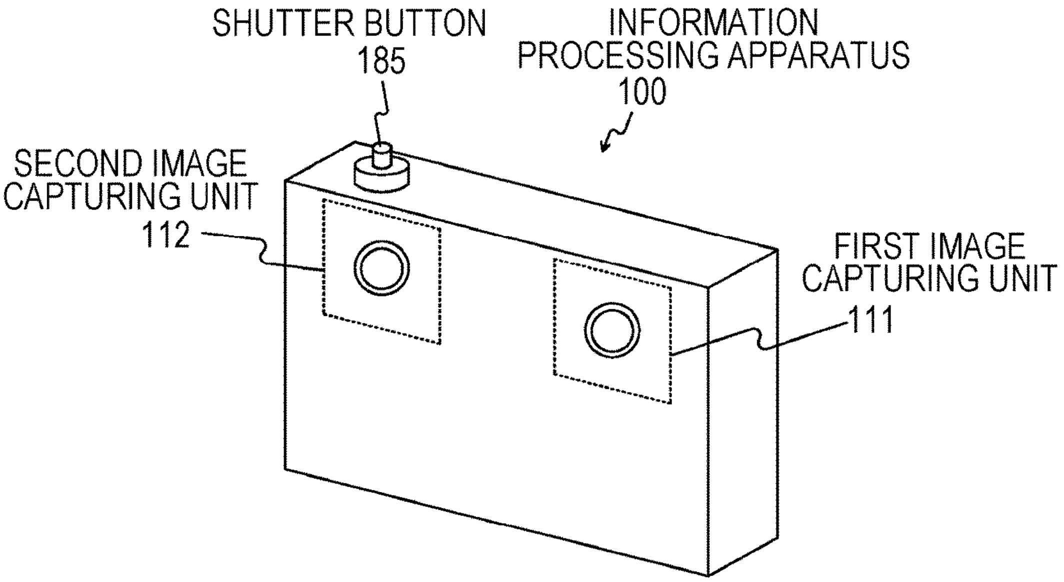
a
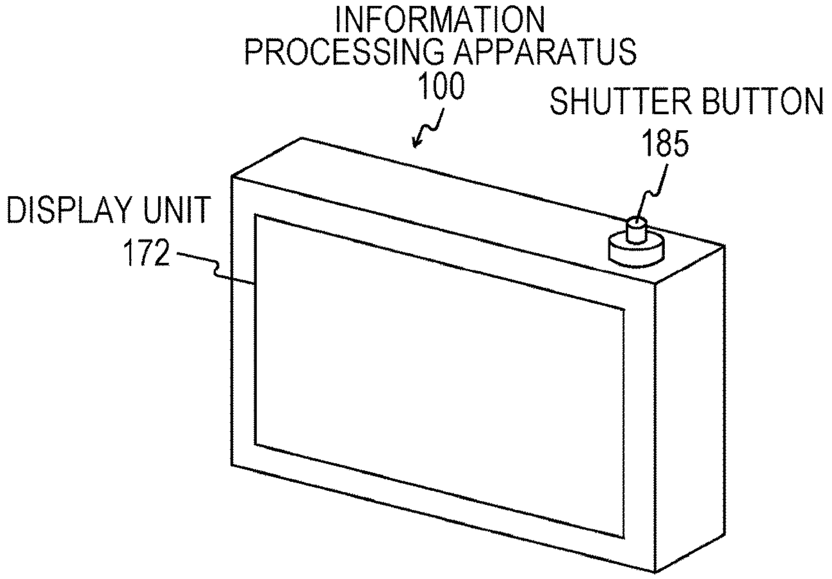
b

[Fig. 2]
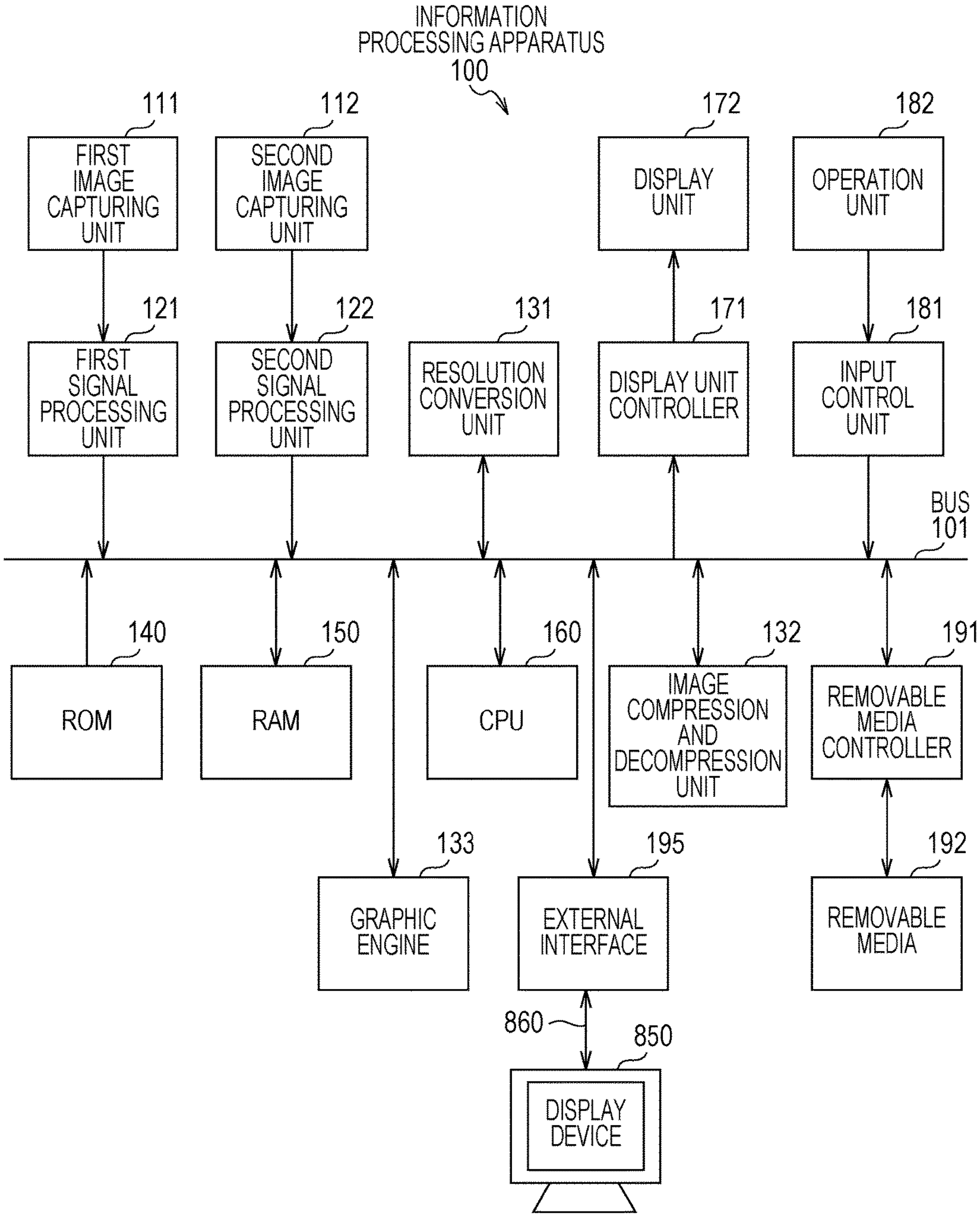

[Fig. 3]
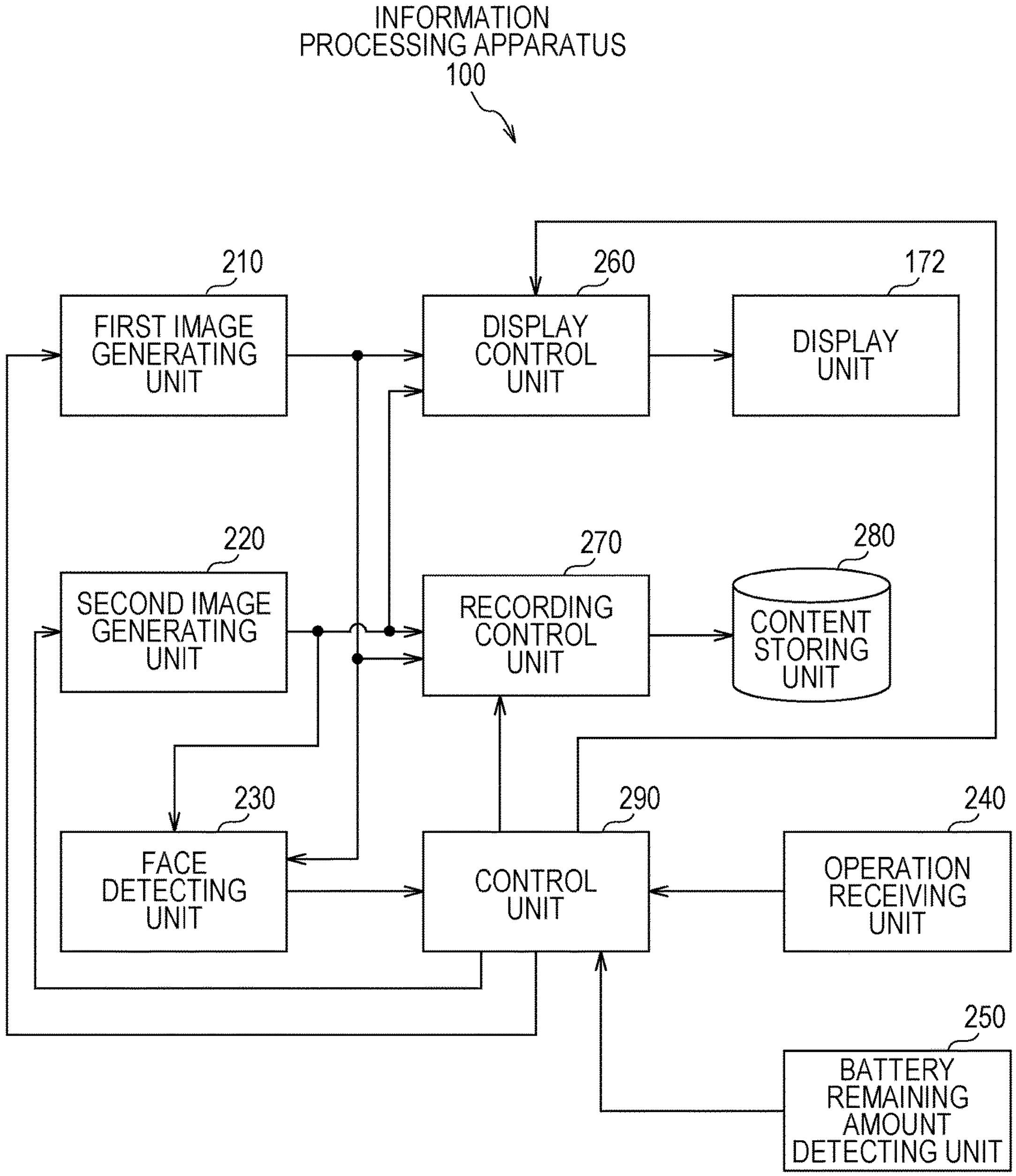

[Fig. 4]
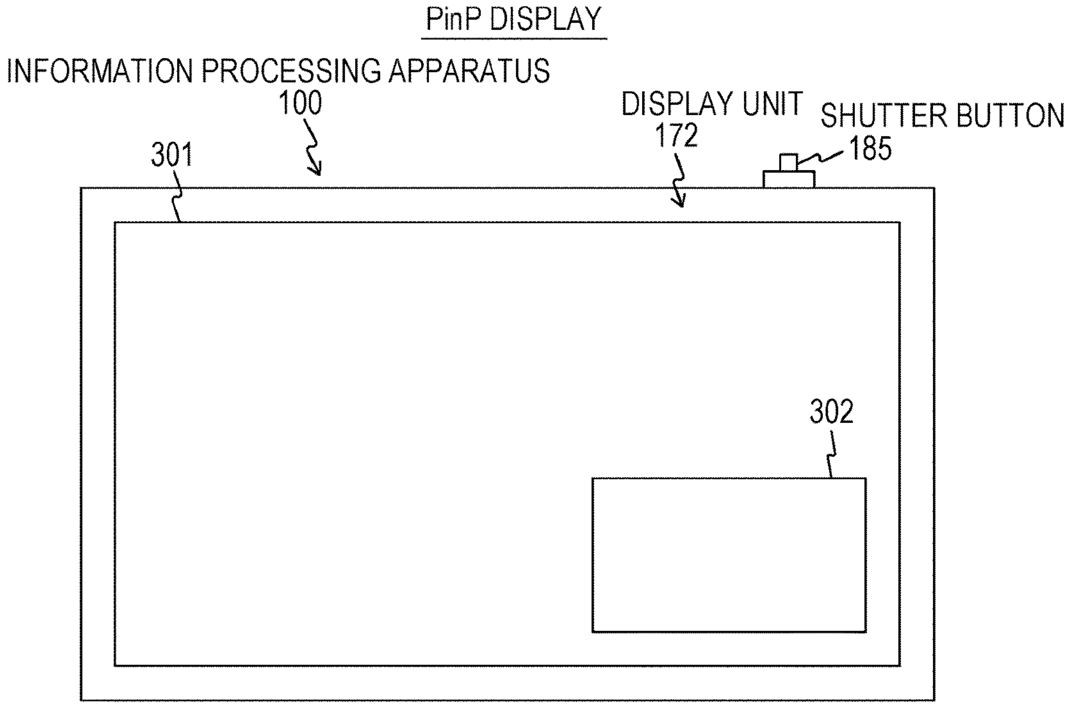
a
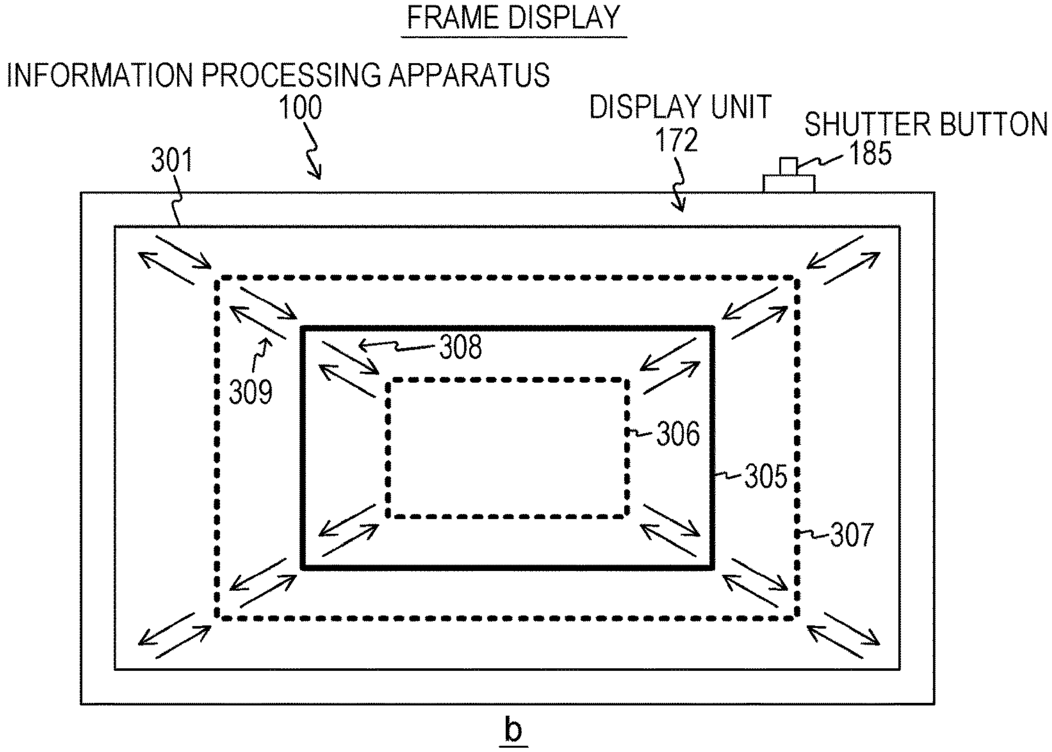
b

[Fig. 5]
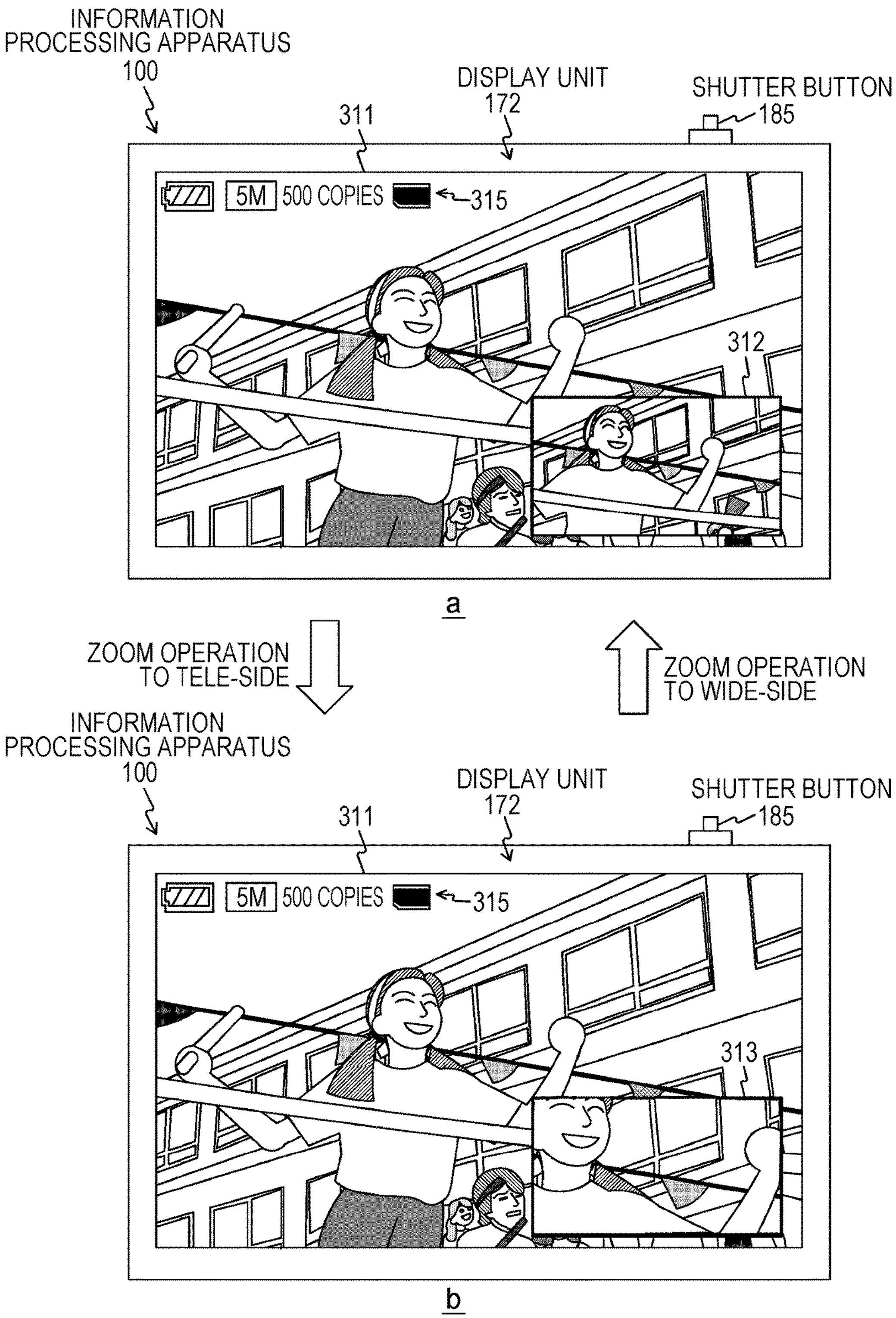

[Fig. 6]
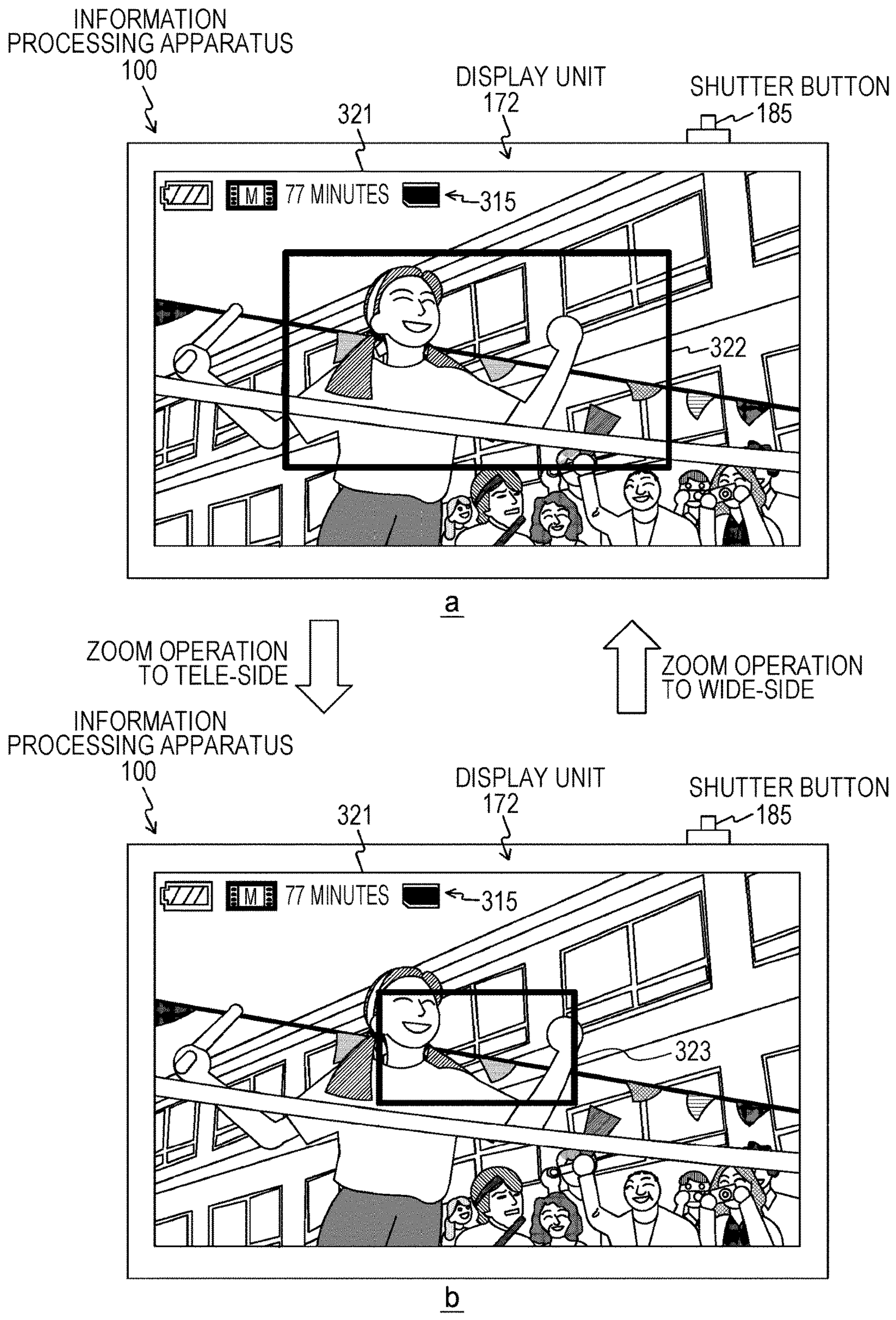

[Fig. 7]
EXAMPLE OF DATA FLOW AT TIME OF PinP DISPLAY
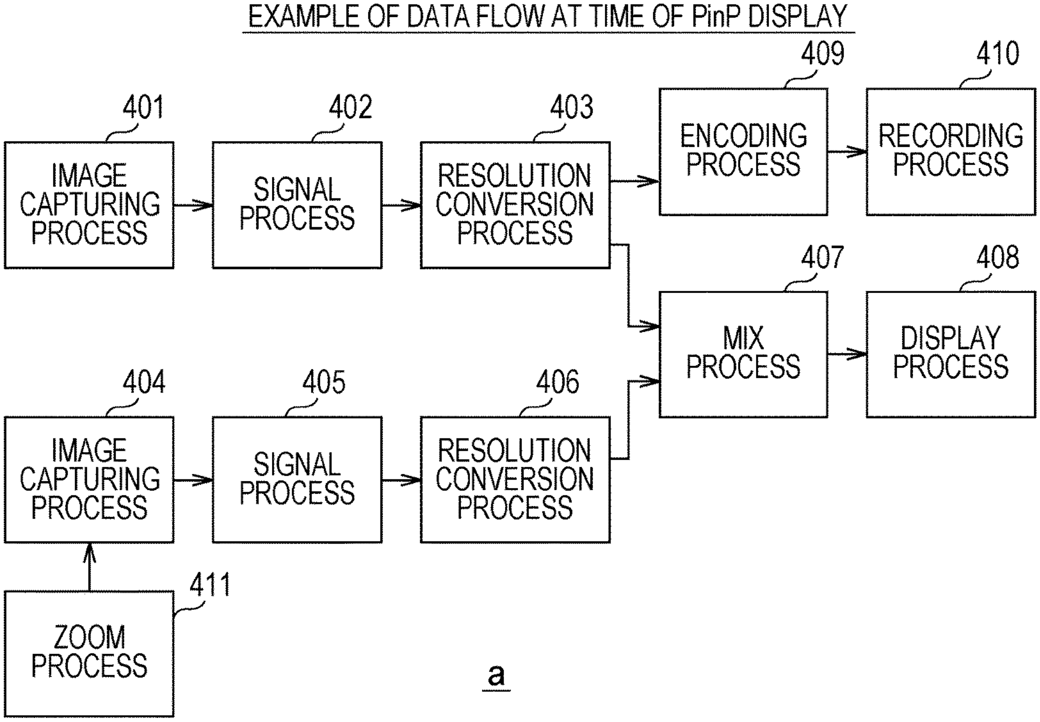
a
EXAMPLE OF DATA FLOW AT TIME OF FRAM DISPLAY
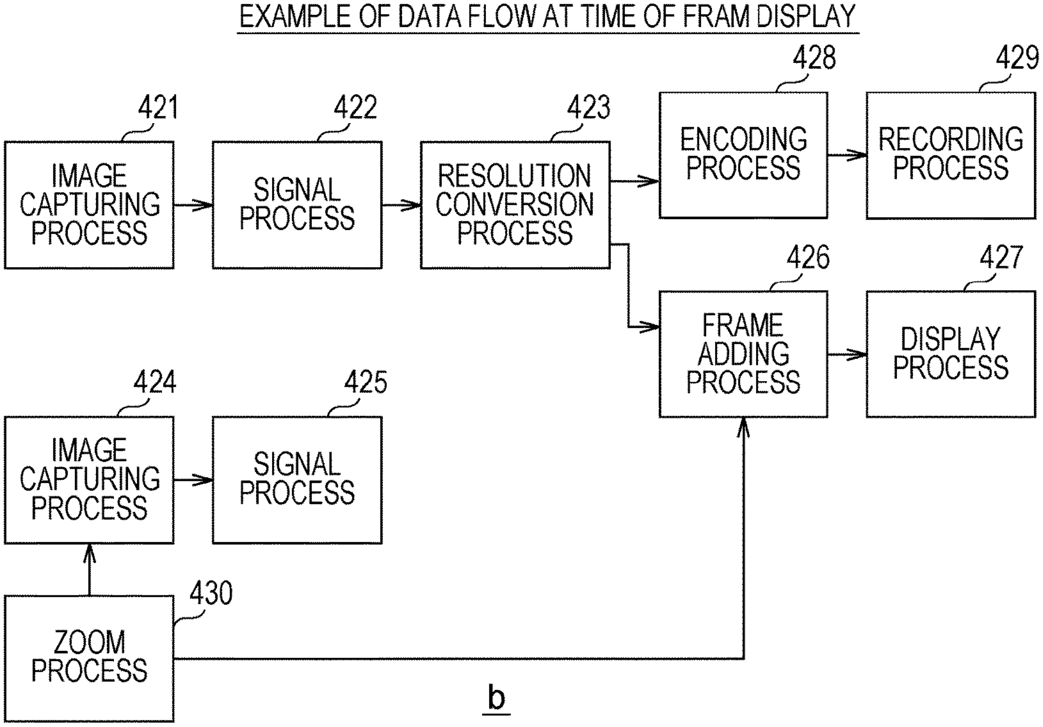
b

[Fig. 8]
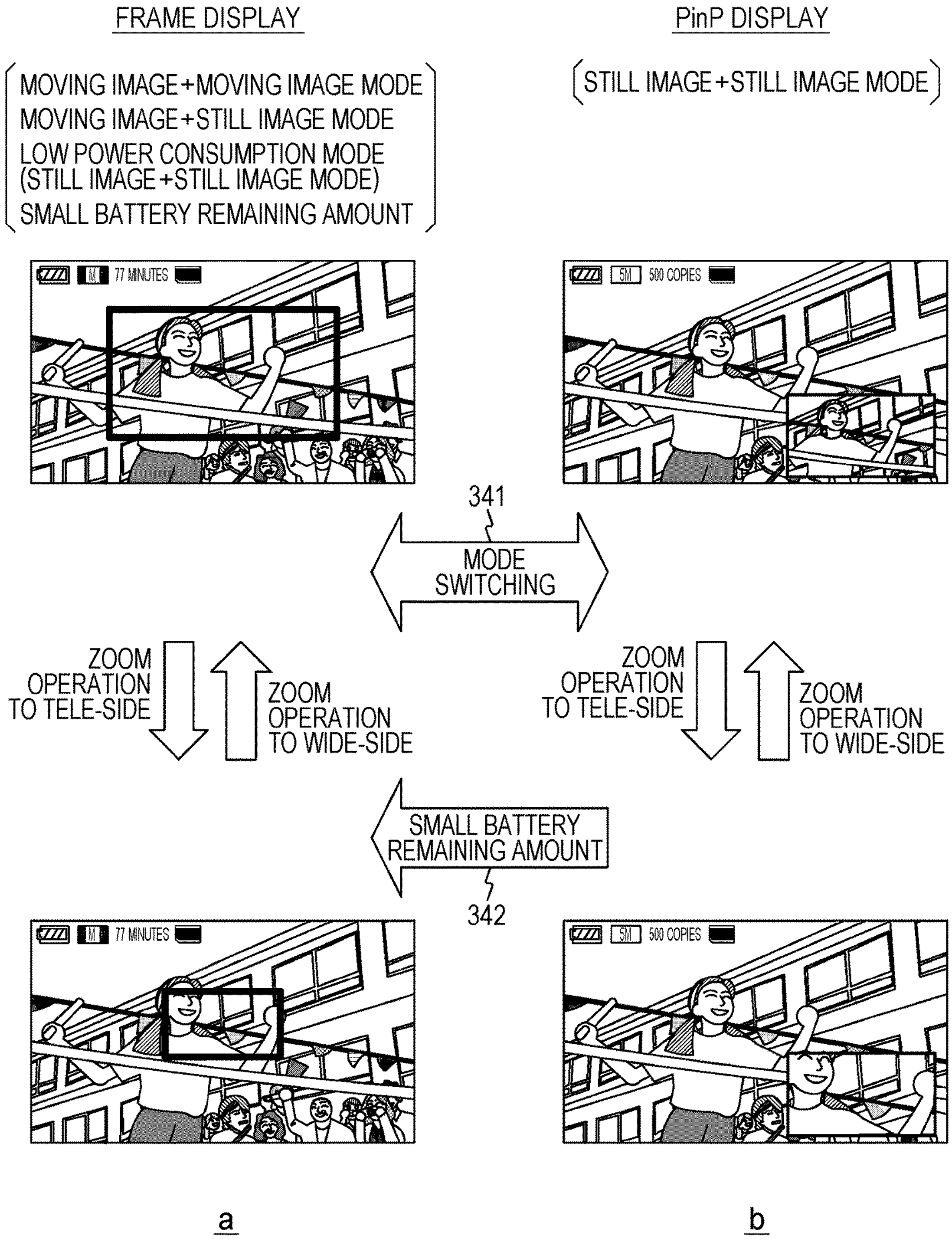

[Fig. 9]
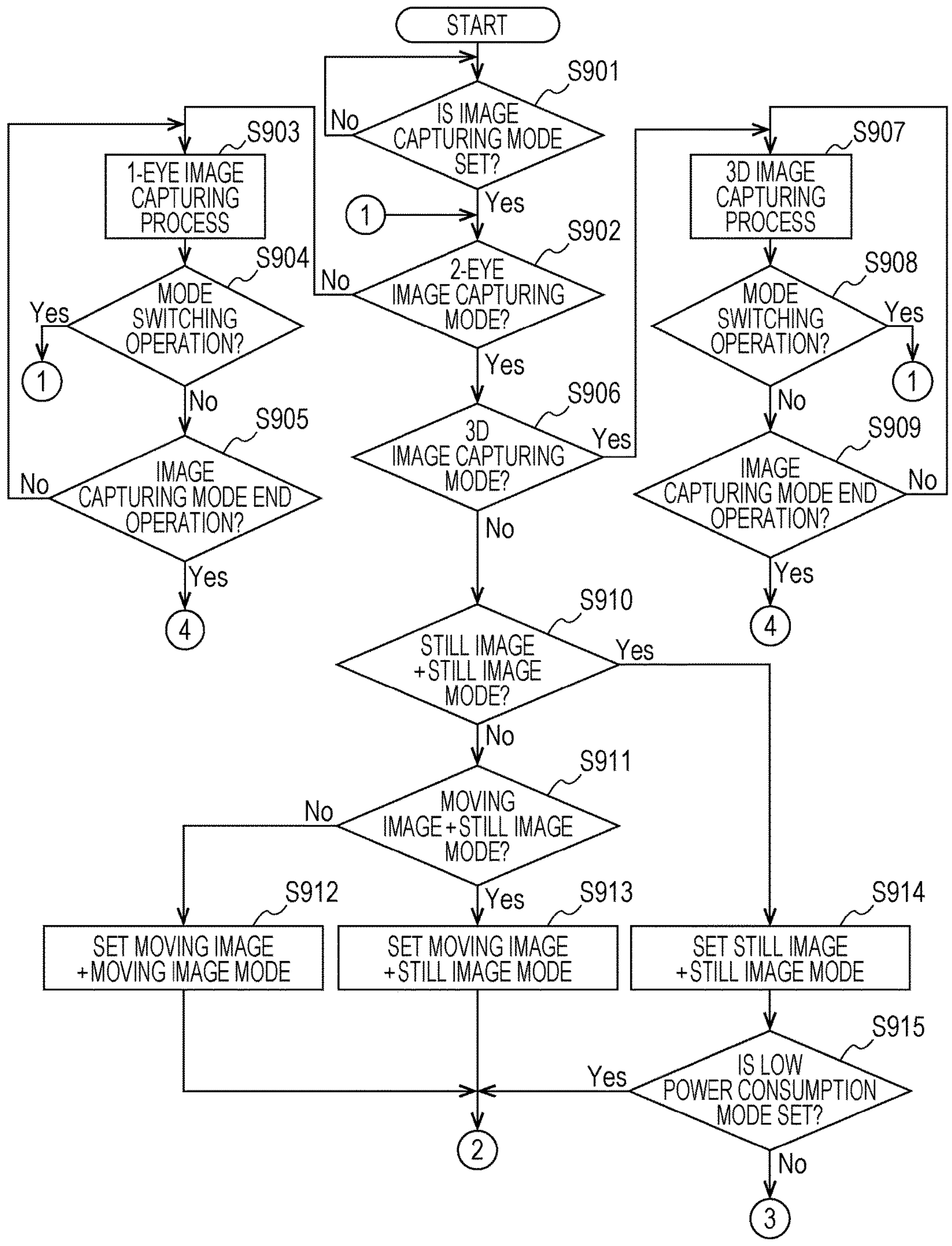

[Fig. 10]
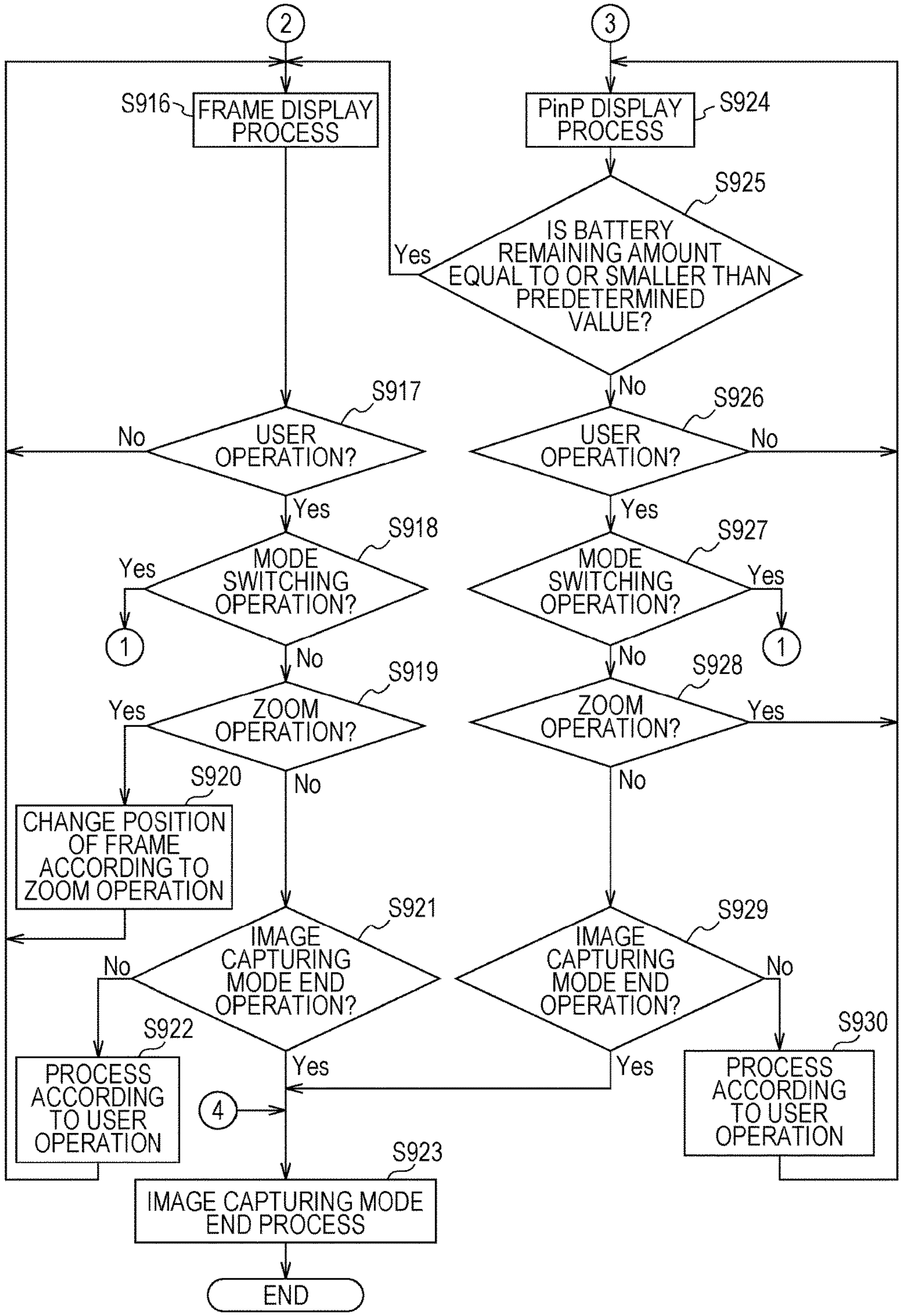

[Fig. 11]
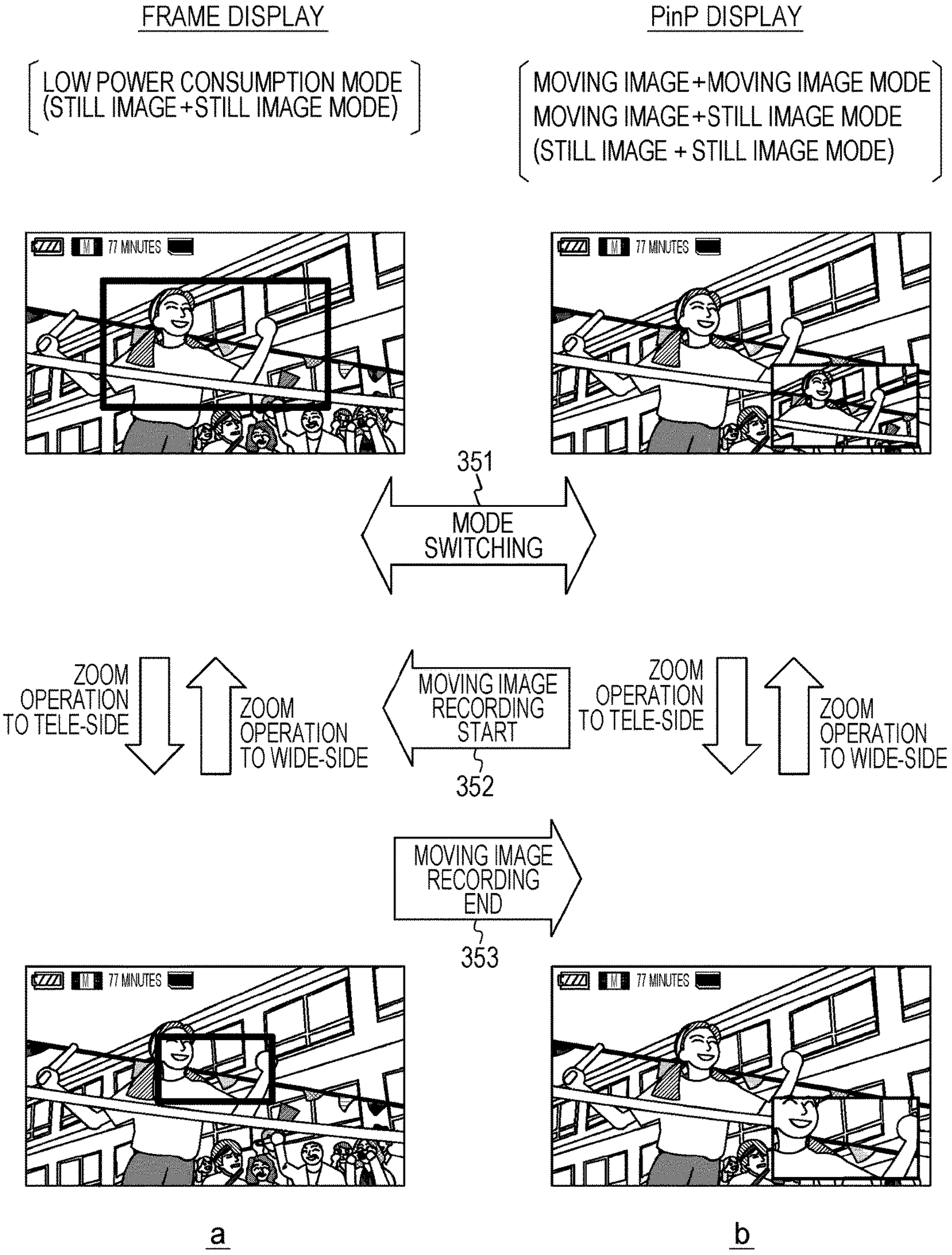

[Fig. 12]
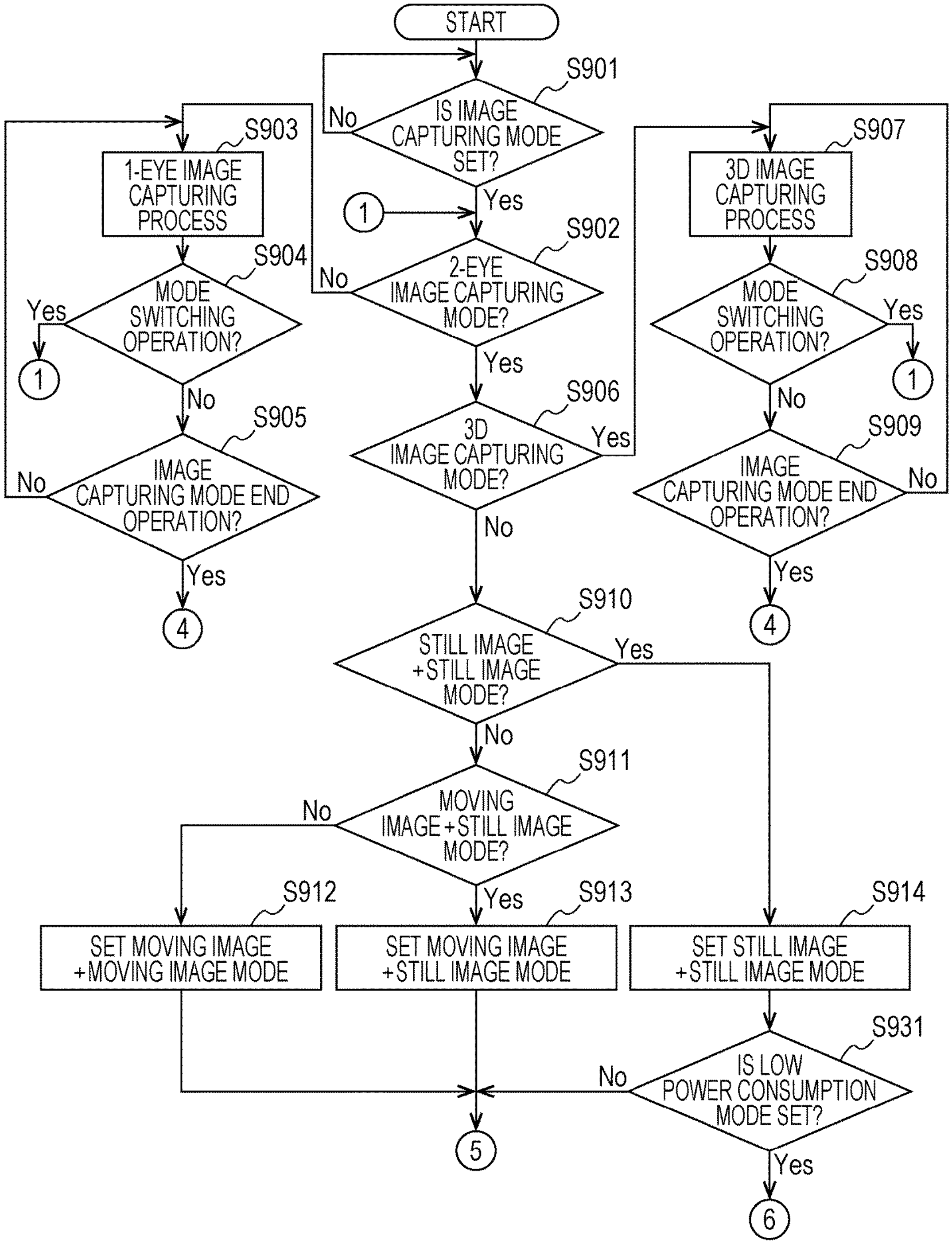

[Fig. 13]
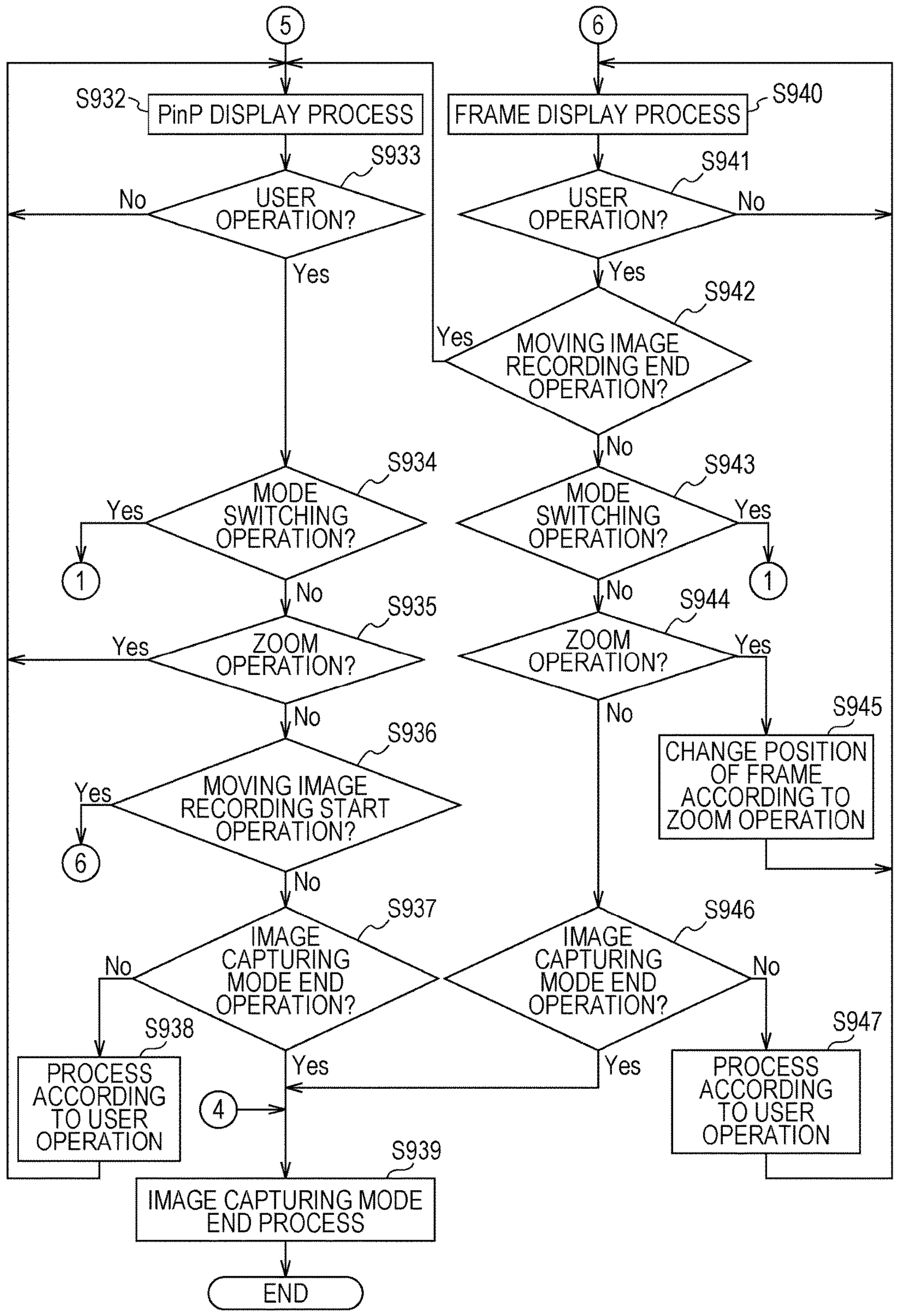

[Fig. 14]
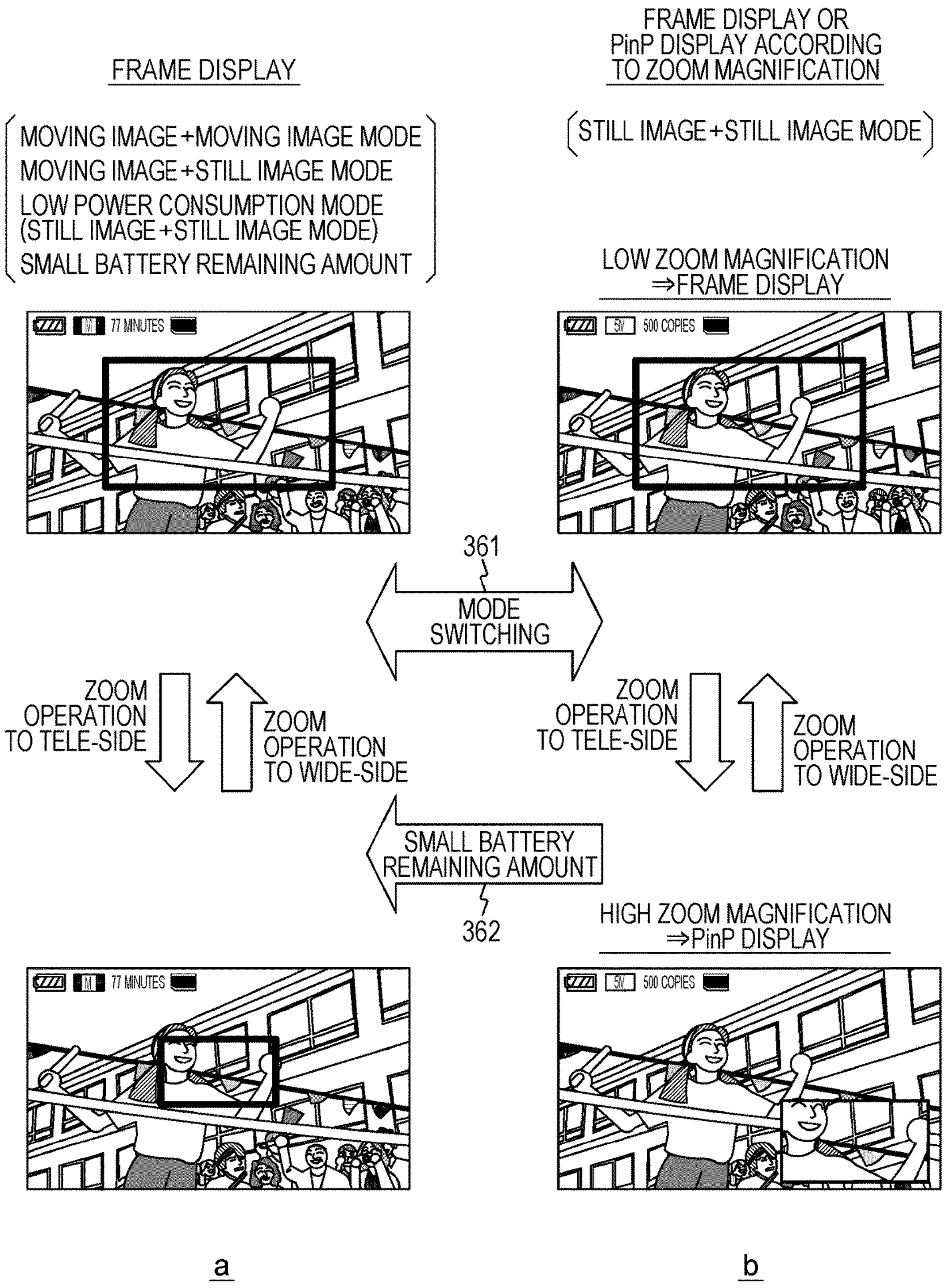

[Fig. 15]
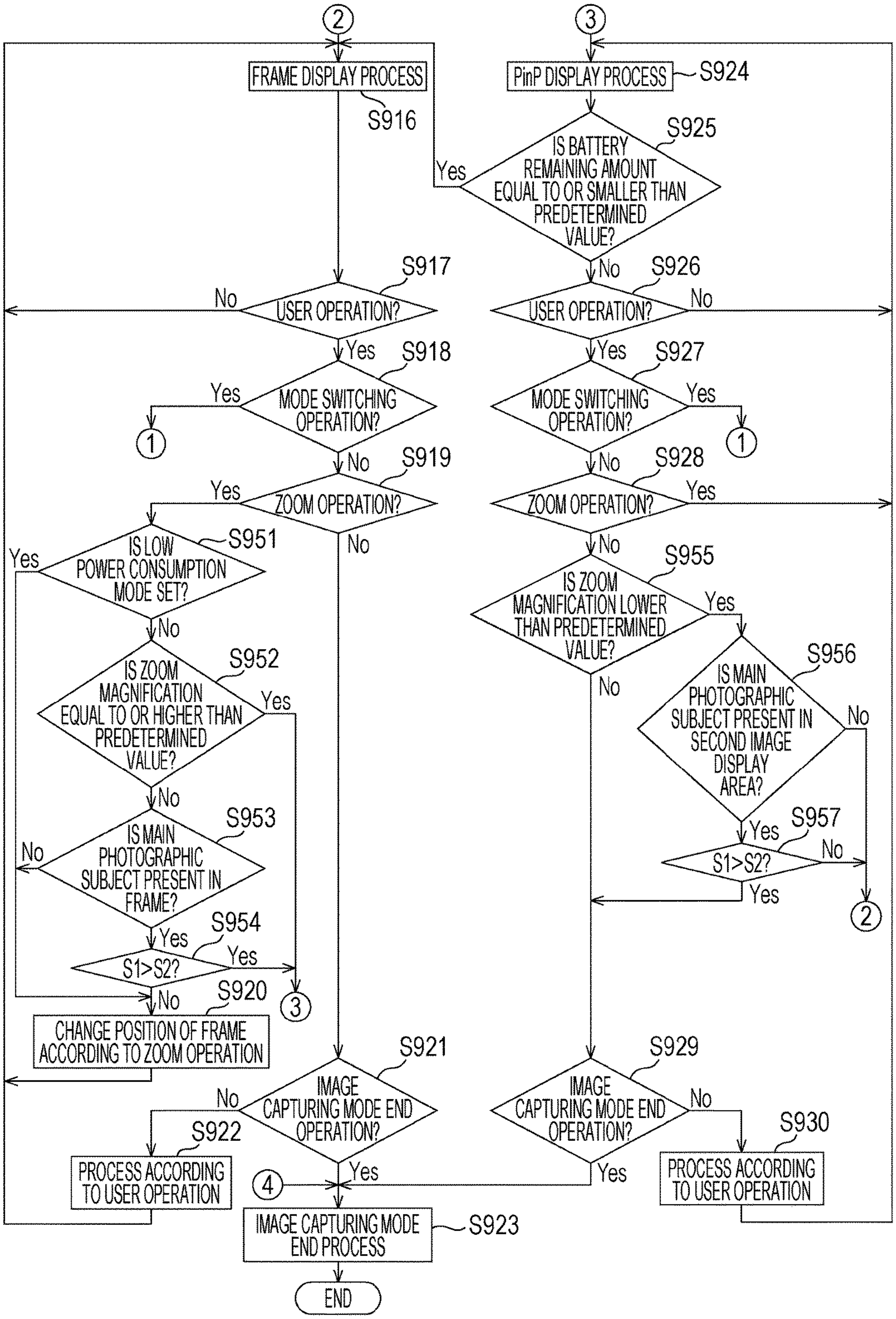

[Fig. 16]
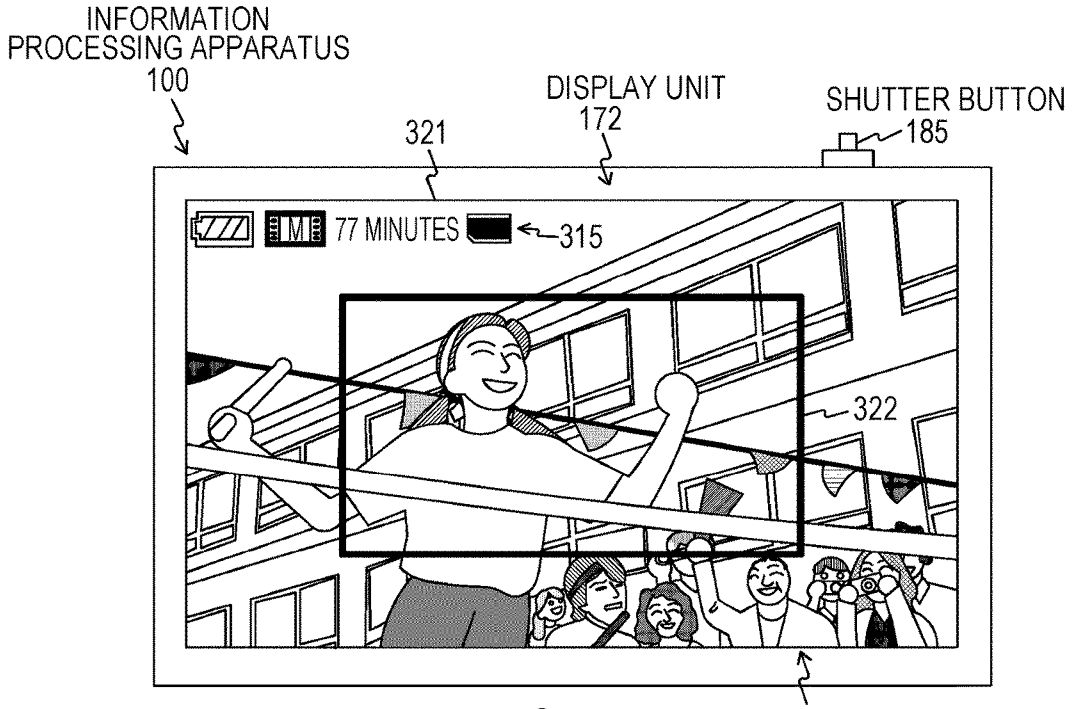
a
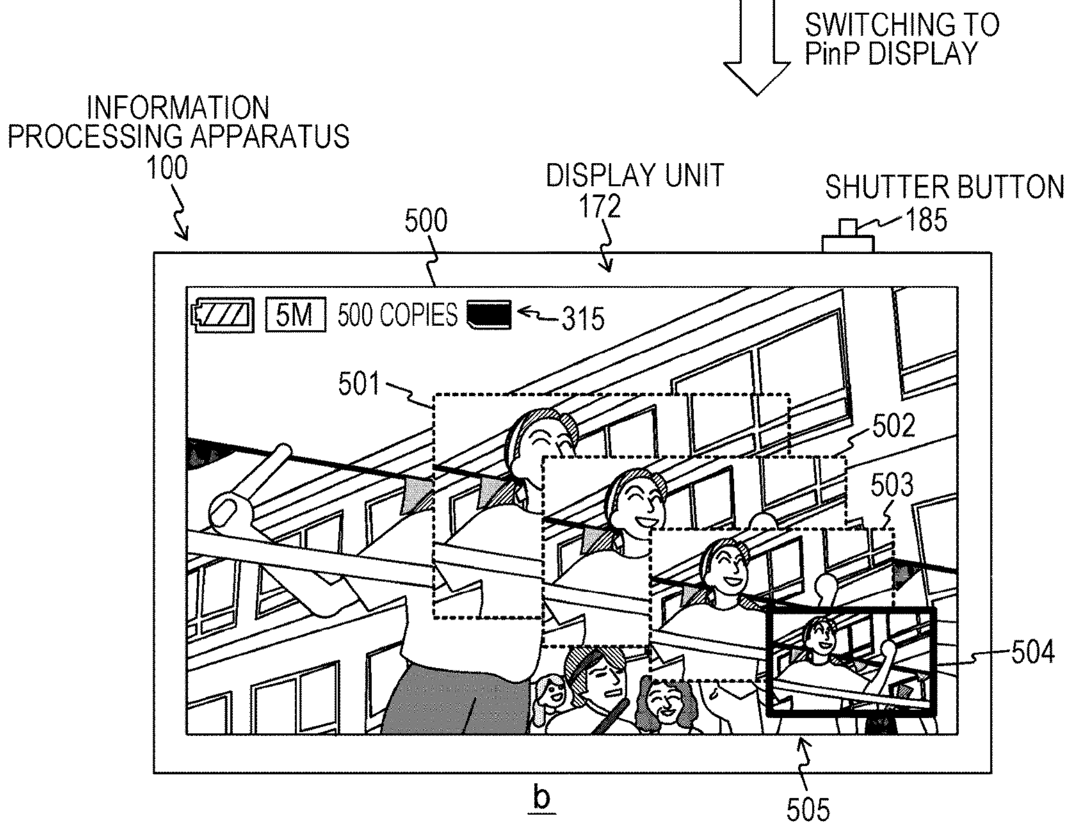
b

[Fig. 17]
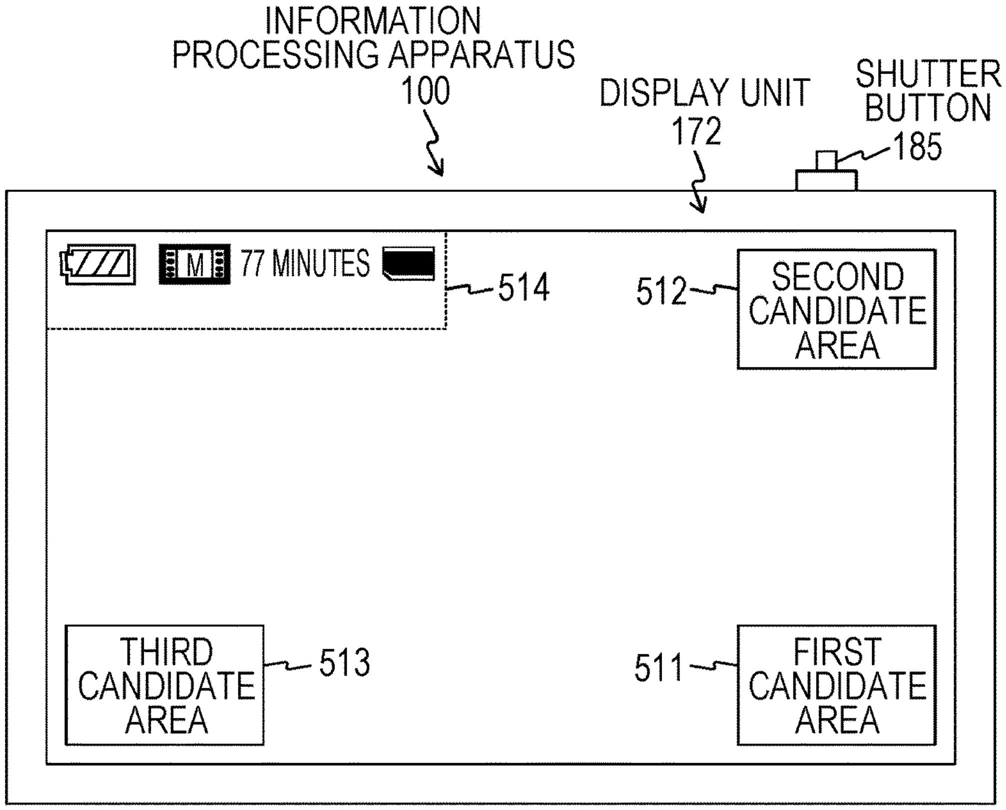

[Fig. 18]
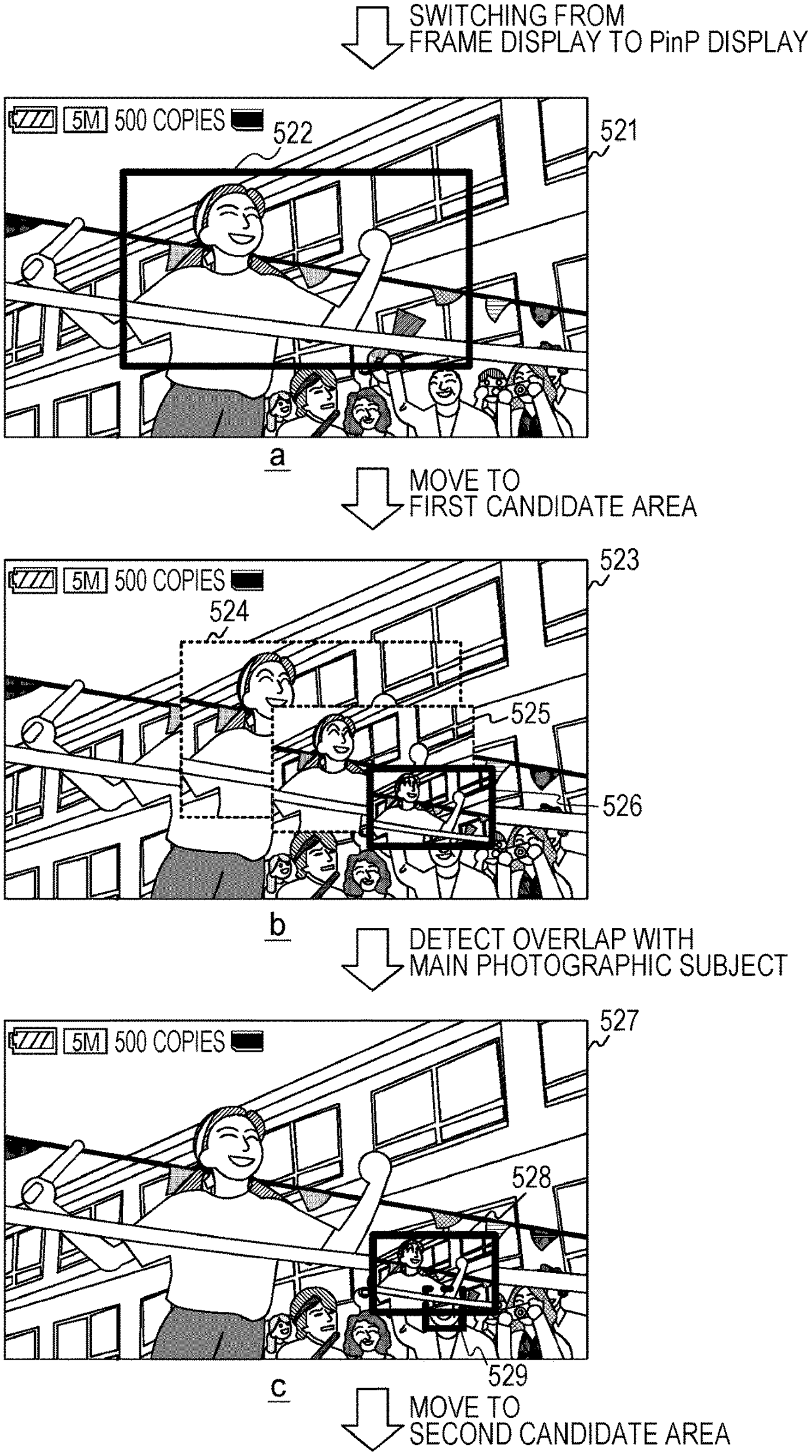

[Fig. 19]
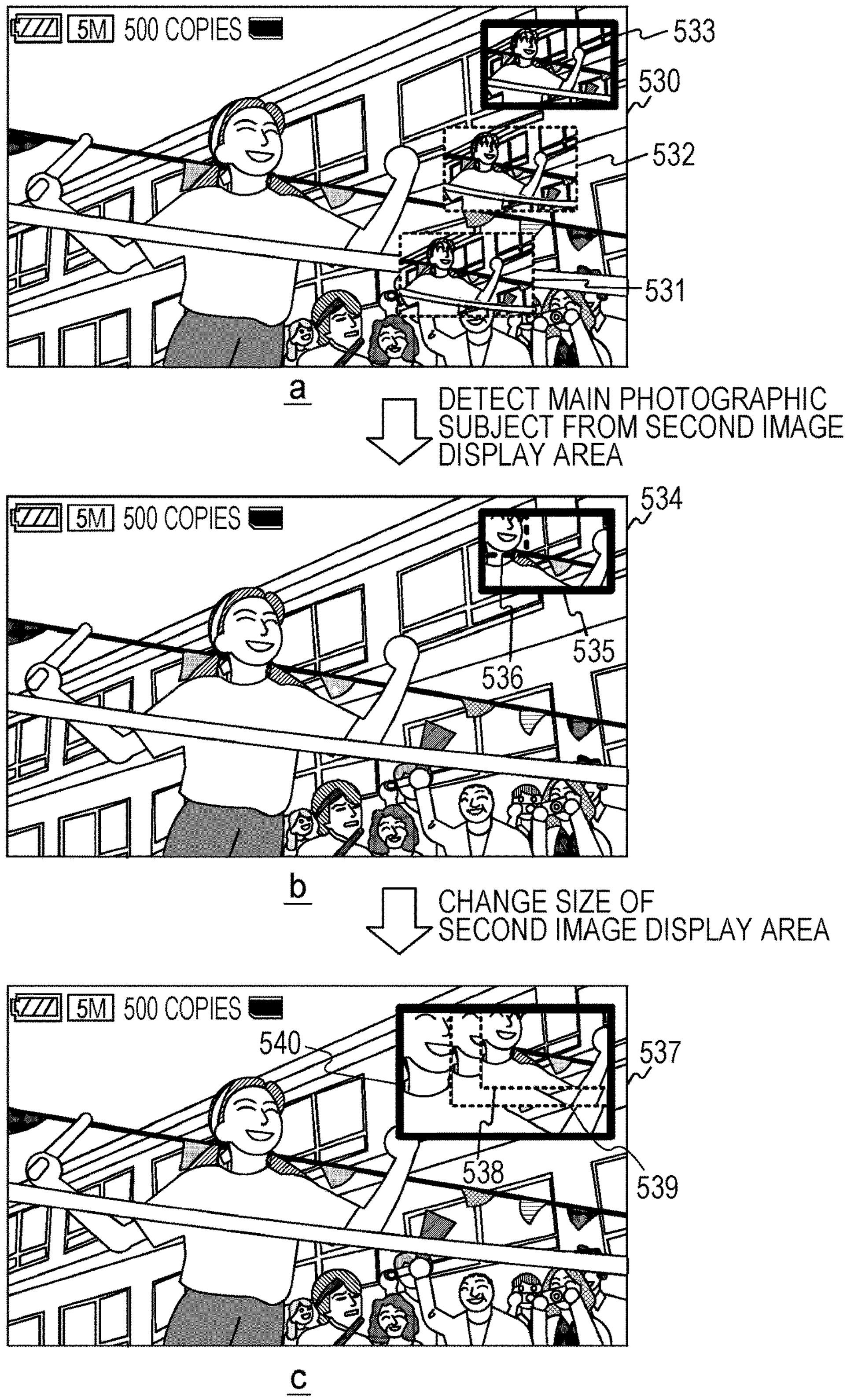

[Fig. 20]
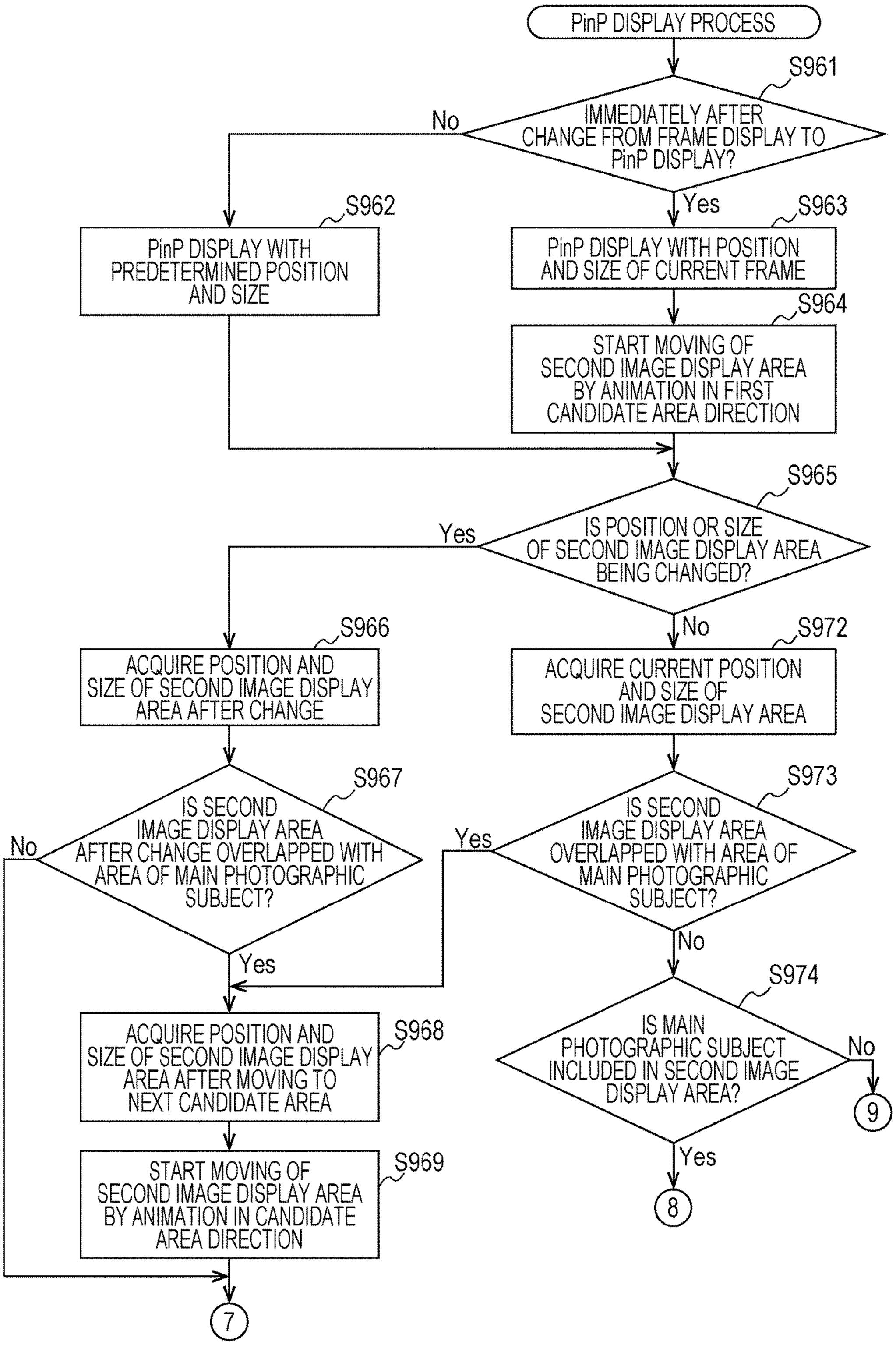

[Fig. 21]
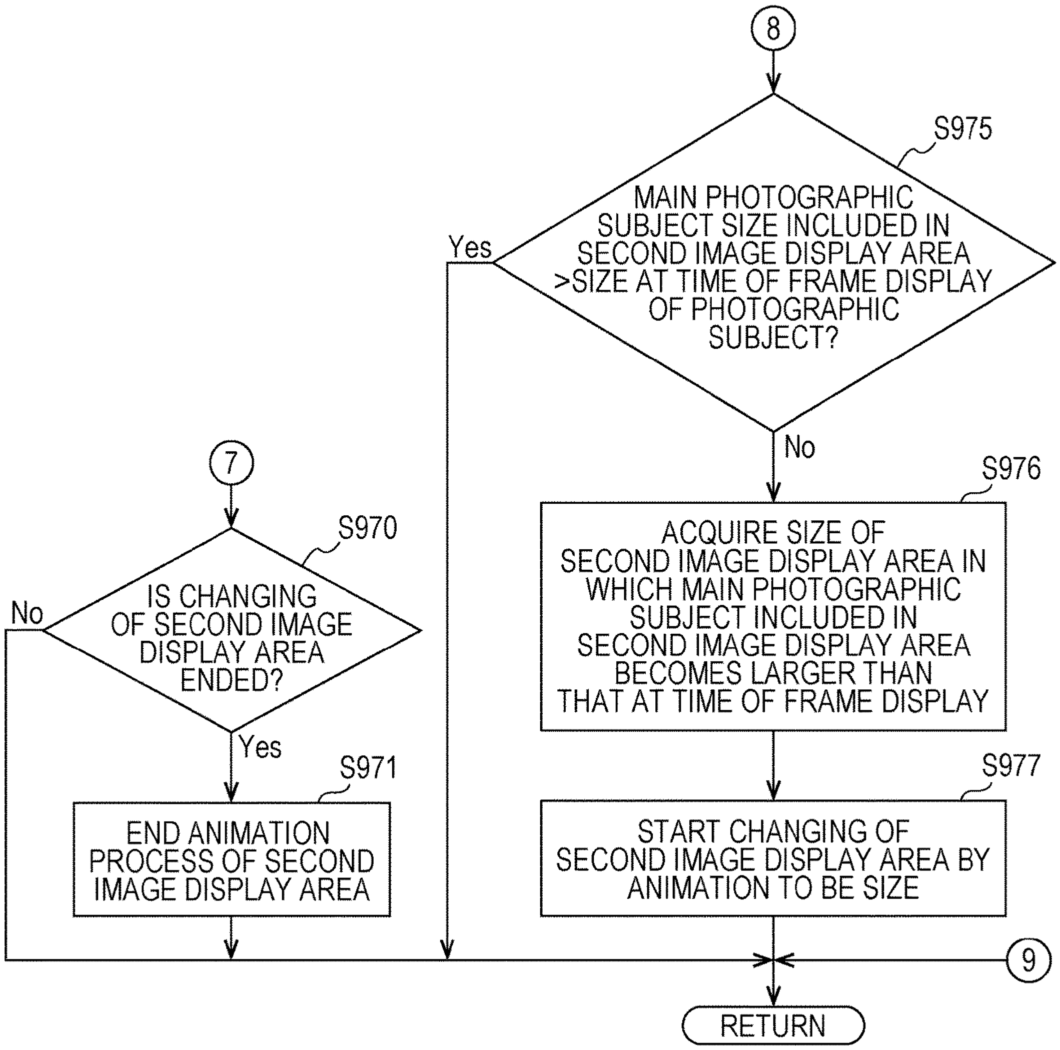

| PHOTOGRAPHIC SUBJECT | | IMPORTANCE |
|---|---|---|
| FACE OF PERSON | CHILD | 5 |
| | WOMEN | 4 |
| | OTHER PERSONS | 3 |
| MOVING OBJECT (PERSON, ANIMAL, ELECTRIC CAR, VEHICLE, ETC.) | | 2 |
| INANIMATE OBJECT (FOCUSED OBJECT) | | 3 |

[Fig. 23]
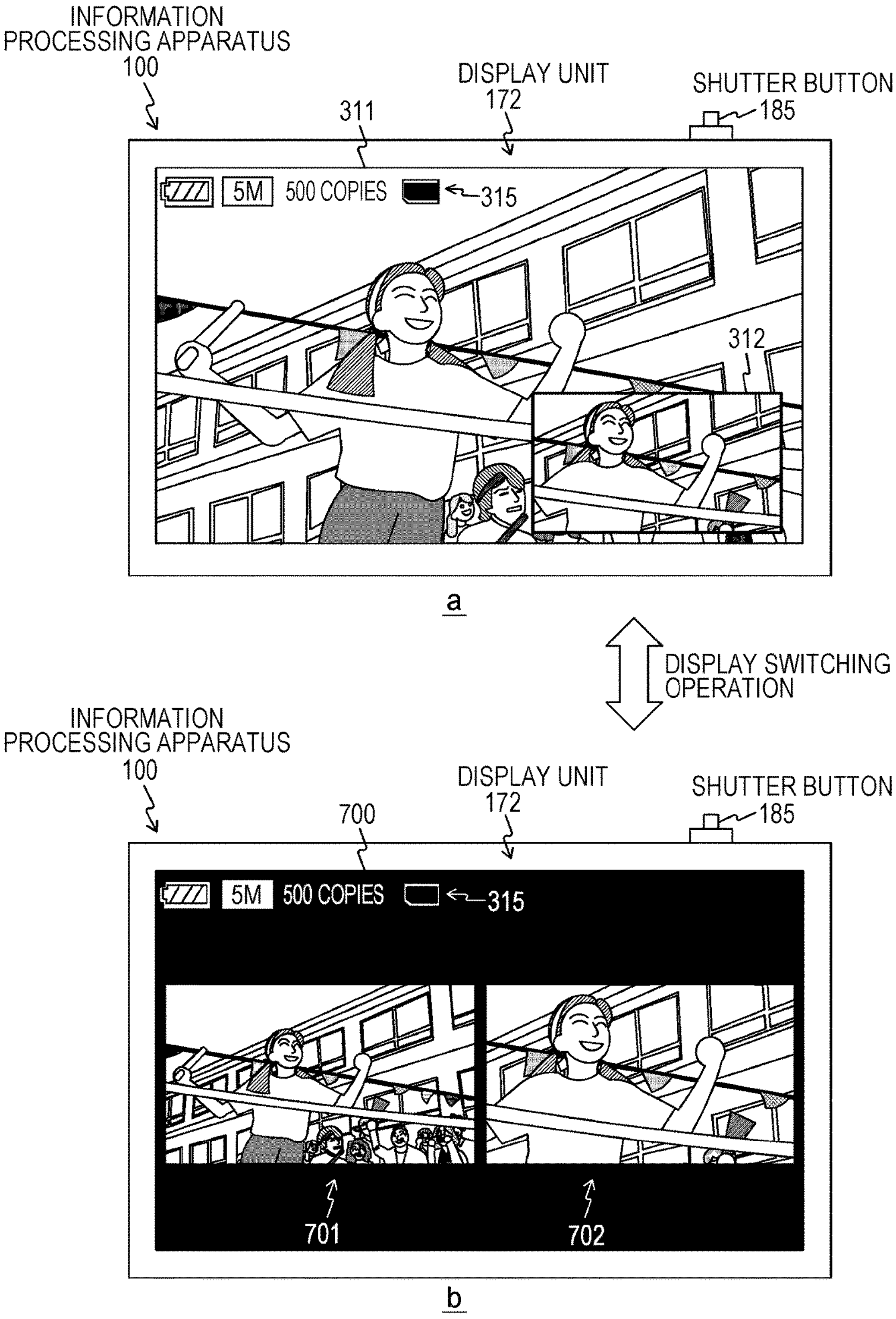

[Fig. 24]
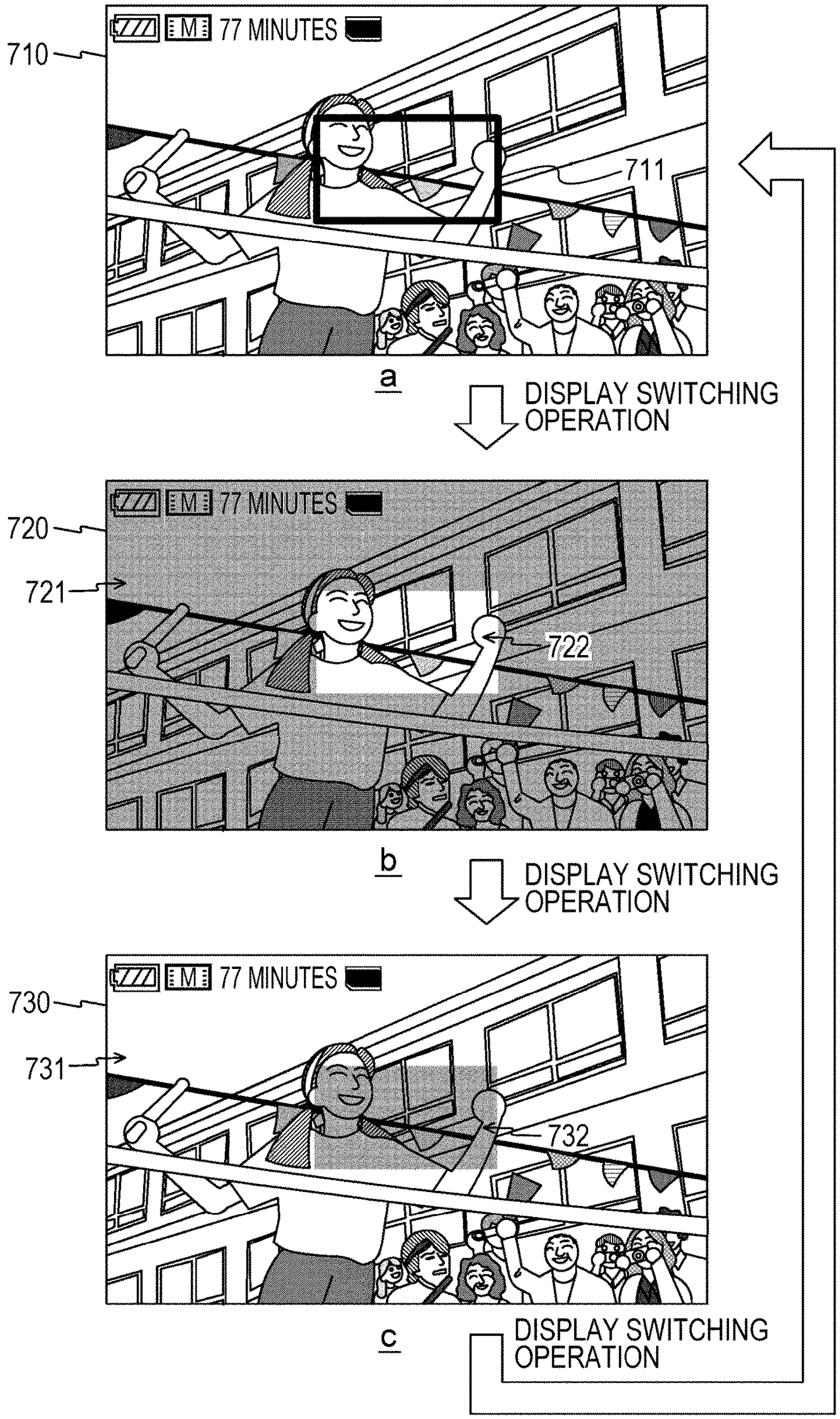

[Fig. 25]
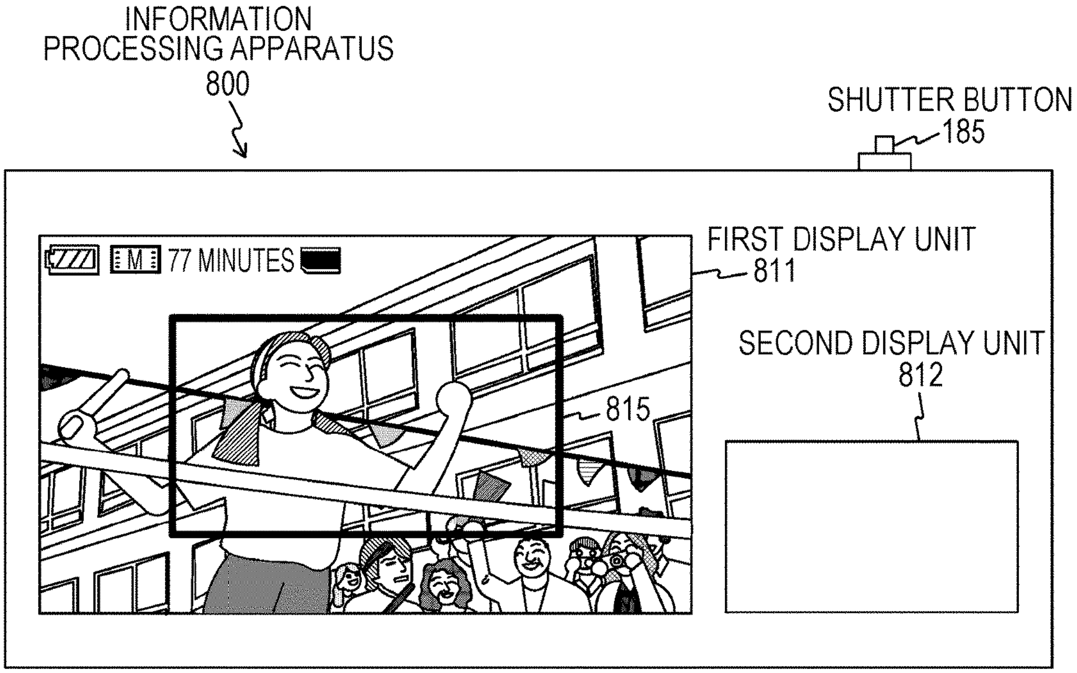
a
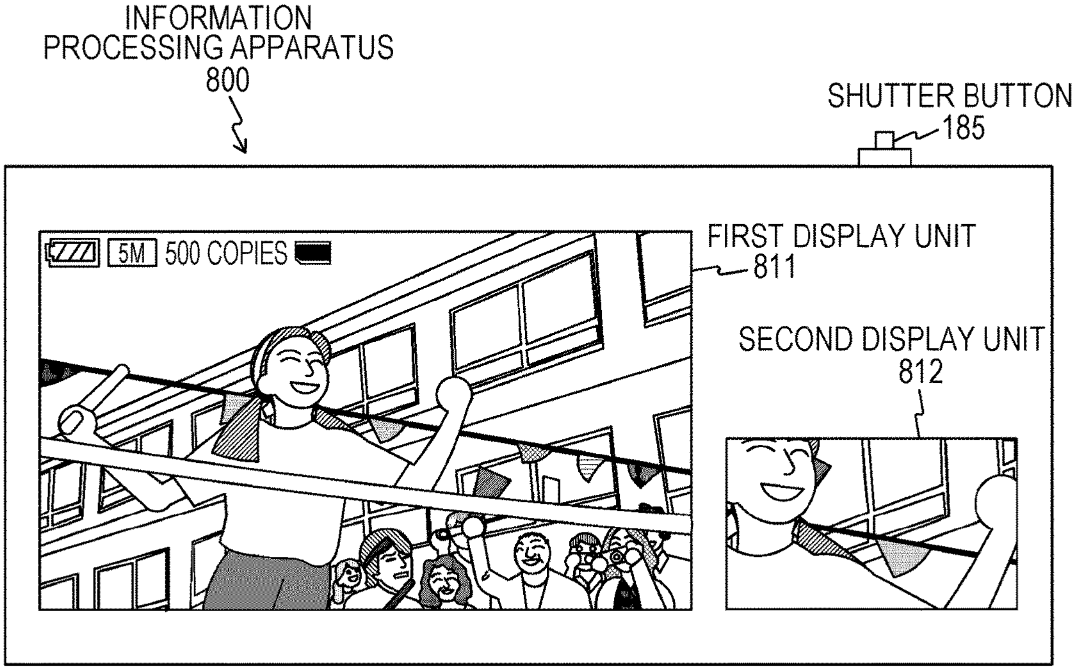
b

[Fig. 26]
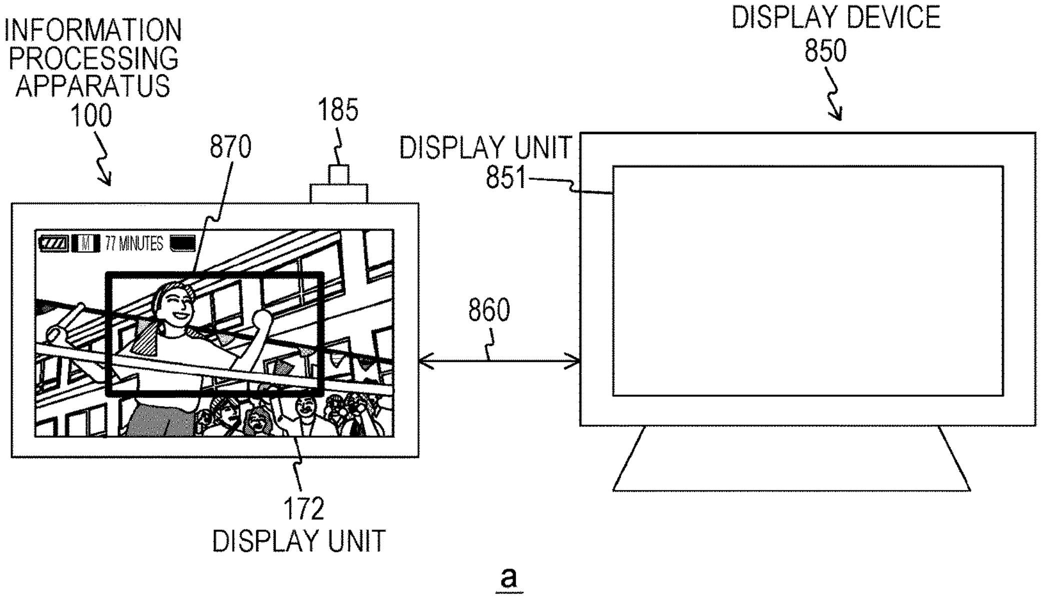
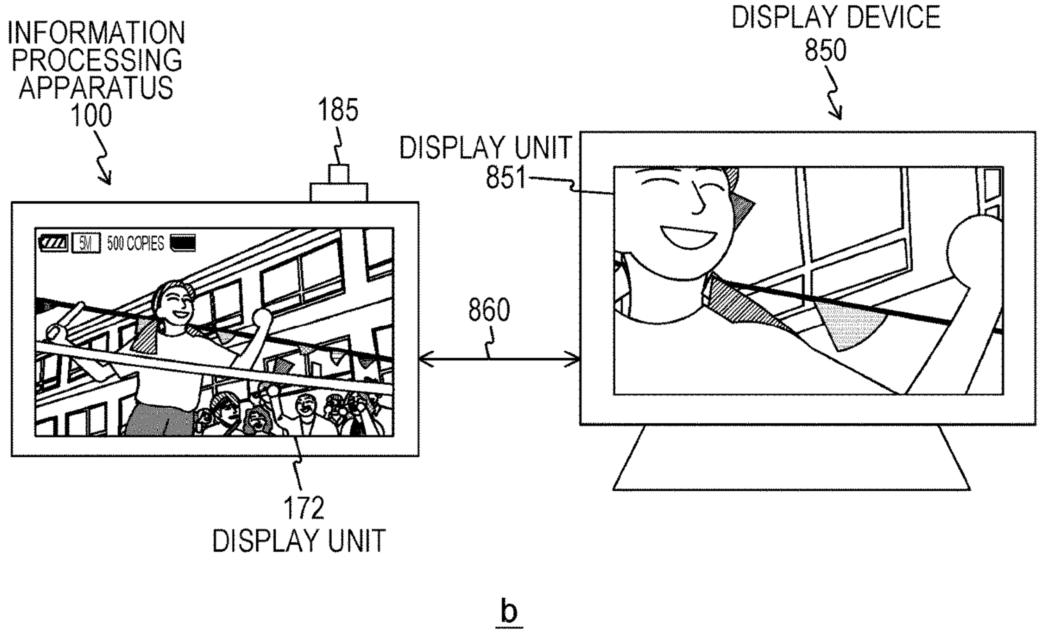

INFORMATION PROCESSING APPARATUS, METHOD, AND NON-TRANSITORY COMPUTER-READABLE MEDIUM

TECHNICAL FIELD

The present technique relates to an information processing apparatus, and particularly, to an information processing apparatus which displays an image, a method of controlling the same, and a non-transitory computer-readable medium including a computer program for causing a computer to execute the method.

BACKGROUND ART

Hitherto, an information processing apparatus such as a digital still camera or a digital video camera (camera-integrated recorder), which associates and records a plurality of images (image data) simultaneously generated by a plurality of image capturing units, has been proposed. For example, an image capturing device which associates and records a plurality of images (image data) for displaying a stereoscopic image to obtain a stereoscopic view using the parallax of the left and right eyes has been proposed.

For example, a two-lens image capturing device that generates two images (stereoscopic images) using two optical systems has been proposed (for example, see Patent Literature 1).

CITATION LIST

Patent Literature

PTL 1: JP 2000-261829A

SUMMARY

Technical Problem

According to the related art described above, it is possible to generate two images (stereoscopic images) using two optical systems. In this way, in the related art described above, since it is possible to generate two images using two optical systems, it is conceivable to generate, for example, two images (for example, two images with different zoom magnifications) other than the stereoscopic images.

For example, when two images (for example, two images with different zoom magnifications) other than the stereoscopic images are generated using two optical systems, image capturing ranges of two such images are different. Accordingly, it is important for a user to easily understand such image capturing ranges.

In addition, recently, small-size information processing apparatuses (for example, an image capturing apparatus) which can be easily carried by a user have come into wide use. There are many cases in which such a portable information processing apparatus is operated by battery driving, and it is important to extend the operation time. For this reason, for example, during the image capturing operation, it is important to reduce the load of a process when displaying an image to suppress power consumption.

The present technique has been made considering such a situation, and an object thereof is to reduce the load of a process when displaying an image while maintaining visibility of a plurality of images.

Solution to Problem

According to a first embodiment, the disclosure is directed to an information processing apparatus comprising: a processor that acquires first image data captured by a first image capturing unit; acquires second image data captured by a second image capturing unit; controls a display to operate in a first mode in which the first and second images are simultaneously displayed; controls the display to operate in a second mode in which a relationship of the second image with the first image is indicated; and selects between at least the first and second modes based on a predetermined condition.

The information processing apparatus may include the first and second image capturing units, and the first and second image capturing units may be a single image capturing unit. The information processing apparatus may also include the display. The processor may also generate a three-dimensional (3D) image based on the first and second image data.

The processor may control the display to display the second image data in an overlapping manner on the first image data when controlling the display to operate in the first mode, and may control the display to display the first image data on an entirety of the display and the second image data an overlapping manner on a portion of the display that is less than the entirety of the display when controlling the display to operate in the first mode.

The first image capturing unit may be set to a first zoom ratio and the second image capturing unit is set to a second zoom ratio. The processor may control the display to display the first image data on an entirety of the display and the second image data an overlapping manner on a portion of the display that is less than the entirety of the display when controlling the display to operate in the first mode. The processor may control the display to modify a size of the portion of the display in which the second image data is displayed when the second zoom ratio is modified.

The processor may control the display to display a graphic indicia on the first image data that represents a range of the second image data that is included in the first image data when controlling the display to operate in the second mode. The graphic indicia may be a frame or predetermined effect that is displayed on the first image data. The predetermined effect may represent a range of the first image data that is not included in the second image data. The first image capturing unit may be set to a first zoom ratio and the second image capturing unit may be set to a second zoom ratio, and the processor may control the display to change a size of the graphic indicia displayed on the first image data when the second zoom ratio is modified.

The predetermined condition may correspond to whether the first and second image data are moving image content or still image content. The processor may control the display to operate in the second mode when the first and second image data are moving image content or the first image data is moving image content and the second image data is still image content. The processor may control the display to operate in the first mode when the first and second image data are still image content.

The predetermined condition may correspond to a difference between the first zoom ratio and the second zoom ratio. The processor may control the display to operate in the first mode when the difference is greater than a predetermined threshold value. The processor may control the display to operate in the second display mode when the difference is less than the predetermined threshold value.

The predetermined condition may correspond to whether a size of a main photographic subject included in the second image data is greater than a size of the main photographic subject included in the first image data.

The processor may detect a face from the first and second image data and identifies the face as the main photographic subject.

The processor may control the display to operate in the first mode when the size of the main photographic subject included in the second image data is greater than the size of the main photographic subject included in the first image data.

The processor may control the display to operate in the second mode when the size of the main photographic subject included in the second image data is not greater than the size of the main photographic subject included in the first image data.

The predetermined condition may correspond to whether a low power consumption mode is set, and the processor may control the display to operate in the second mode when the low power consumption mode is set.

The predetermined condition may correspond to an amount of battery power remaining, and the processor may control the display to operate in the second mode when the amount of battery power remaining is less than a predetermined threshold value.

The processor may control the display to display an animation when switching between the first and second modes.

The animation may include sequentially reducing a size of the second image data when switching between the second mode and the first mode.

The processor may identify a main photographic subject included in the first and second image data, and control the display to display the second image data at a location overlapping the first image data that does not correspond to a position of the main photographic subject in the first image data when controlling the display to operate in the first mode.

According to another exemplary embodiment, the disclosure is directed to an information processing method comprising: acquiring first image data captured by a first image capturing unit; acquiring second image data captured by a second image capturing unit; controlling a display to operate in a first mode in which the first and second images are simultaneously displayed; controlling the display to operate in a second mode in which a relationship of the second image with the first image is indicated; and selecting between at least the first and second modes based on a predetermined condition.

According to another exemplary embodiment, the disclosure is directed to a non-transitory computer-readable medium including computer program instructions, which when executed by an information processing apparatus, cause the information processing apparatus to perform a process, the process comprising: acquiring first image data captured by a first image capturing unit; acquiring second image data captured by a second image capturing unit; controlling a display to operate in a first mode in which the first and second images are simultaneously displayed; controlling the display to operate in a second mode in which a relationship of the second image with the first image is indicated; and selecting between at least the first and second modes based on a predetermined condition.

Advantageous Effects of Invention

According to the present technique, it is possible to obtain an excellent effect capable of maintaining the visibility of the plurality of images, and reducing the load of the process at the time of image display.

BRIEF DESCRIPTION OF DRAWINGS

FIG. 1 is a perspective view illustrating an external appearance of an information processing apparatus 100 according to a first embodiment of the present technique.

FIG. 2 is a block diagram illustrating an example of an internal configuration of the information processing apparatus 100 according to the first embodiment of the present technique.

FIG. 3 is a block diagram illustrating a functional configuration example of the information processing apparatus 100 according to the first embodiment of the present technique.

FIG. 4 is a diagram illustrating a display example of a display unit 172 when a two-lens image capturing mode is set in the information processing apparatus 100 according to the first embodiment of the present technique.

FIG. 5 is a diagram illustrating a transition example of PinP display displayed on the display unit 172 according to the first embodiment of the present technique.

FIG. 6 is a diagram illustrating a transition example of frame display displayed on the display unit 172 according to the first embodiment of the present technique.

FIG. 7 is a diagram schematically illustrating flow of data at the time of an image capturing operation of the information processing apparatus 100 according to the first embodiment of the present technique.

FIG. 8 is a diagram illustrating a transition example of frame display and PinP display displayed on the display unit 172 according to the first embodiment of the present technique.

FIG. 9 is a flowchart illustrating an example of a process sequence of a display mode setting process by the information processing apparatus 100 according to the first embodiment of the present technique.

FIG. 10 is a flowchart illustrating an example of a process sequence of a display mode setting process by the information processing apparatus 100 according to the first embodiment of the present technique.

FIG. 11 is a diagram illustrating a transition example of frame display and PinP display displayed on the display unit 172 according to a second embodiment of the present technique.

FIG. 12 is a flowchart illustrating an example of a process sequence of a display mode setting process by the information processing apparatus 100 according to the second embodiment of the present technique.

FIG. 13 is a flowchart illustrating an example of a process sequence of a display mode setting process by the information processing apparatus 100 according to the second embodiment of the present technique.

FIG. 14 is a diagram illustrating a transition example of frame display and PinP display displayed on the display unit 172 according to a third embodiment of the present technique.

FIG. 15 is a flowchart illustrating an example of a process sequence of a display mode setting process by the information processing apparatus 100 according to the third embodiment of the present technique.

FIG. 16 is a diagram illustrating a transition example from frame display to PinP display displayed on the display unit 172 according to a fourth embodiment of the present technique.

FIG. 17 is a diagram illustrating an example of a candidate of disposing a second image display area in a display area of the display unit 172 according to the fourth embodiment of the present technique.

FIG. 18 is a diagram illustrating a transition example from frame display to PinP display displayed on the display unit 172 according to the fourth embodiment of the present technique.

FIG. 19 is a diagram illustrating a transition example from frame display to PinP display displayed on the display unit 172 according to the fourth embodiment of the present technique.

FIG. 20 is a flowchart illustrating an example of a process sequence of a PinP display process by the information processing apparatus 100 according to the fourth embodiment of the present technique.

FIG. 21 is a flowchart illustrating an example of a process sequence of a Pinp display process by the information processing apparatus 100 according to the fourth embodiment of the present technique.

FIG. 22 is a diagram illustrating an example of a main photographic subject used when the control unit 290 determines movement or change in size of the second image display area according to the fourth embodiment of the present technique.

FIG. 23 is a diagram illustrating a transition example of PinP display displayed on the display unit 172 according to a modification example of the present technique.

FIG. 24 is a diagram illustrating a transition example of a display screen displayed on the display unit 172 according to a modification example of the present technique.

FIG. 25 is a diagram illustrating an external appearance configuration example of an information processing apparatus 800 according to a modification example of the present technique.

FIG. 26 is a diagram illustrating an external appearance configuration example of an information processing apparatus 100 and a display device 850 according to a modification example of the present technique.

DESCRIPTION OF EMBODIMENTS

Hereinafter, embodiments for embodying the present technique (hereinafter, referred to as embodiments) will be described. The description is performed in the following order.

1. First Embodiment (a display mode setting control: an example of setting a display mode on the basis of a set image capturing mode, a low power consumption mode or not, and a battery remaining amount, during an image capturing operation)
2. Second Embodiment (a display mode setting control: an example of setting a display mode on the basis of whether or not a moving image recording operation or the like, during an image capturing operation)
3. Third Embodiment (a display mode setting control: an example of setting a display mode on the basis of a zoom magnification or the like, during an image capturing operation)
4. Fourth Embodiment (a display mode setting control: an example of animation display of transition of an image when switching a display mode).
5. Modification Example
6. Modification Example
7. Modification Example

1. First Embodiment

External Appearance Configuration Example of Information Processing Apparatus FIG. 1 is a perspective view illustrating an external appearance of an information processing apparatus 100 according to a first embodiment of the present technique. In FIG. 1, "a" is a perspective view illustrating the external appearance on a front face (that is, a face on which a lens directed to a photographic subject is provided) side of the information processing apparatus 100. In FIG. 1, "b" is a perspective view illustrating an external appearance on a rear face (that is, a face on which a display unit 172 directed to a photographer is provided) side of the information processing apparatus 100.

The information processing apparatus 100 is provided with a first image capturing unit 111, and a second image capturing unit 112, a display unit 172, and a shutter button 185. The information processing apparatus 100 is an image capturing apparatus that captures an image of a photographic subject to generate an image (image data), and can record the generated image as an image content (a still image content or moving image content) on a recording medium (a removable medium 192 shown in FIG. 2). In addition, the information processing apparatus 100 is an image capturing apparatus (a so-called two-lens camera) that is provided with a 2-systematic image capturing element (an imager), and can generate an image content for displaying a stereoscopic image (a 3D image). In addition, the stereoscopic image (the 3D image) is an image capable of obtaining stereopsis using the parallax of the left and right eyes.

For example, each of the first image capturing unit 111 and the second image capturing unit 112 captures an image of the photographic subject to generate two images (a left functional image (a left eye image) and a right functional image (a right eye image) for displaying a stereoscopic image). Image content for displaying the stereoscopic image is generated on the basis of two generated images.

In the information processing apparatus 100, separately from an image capturing operation of the stereoscopic image, each of the first image capturing unit 111 and the second image capturing unit 112 independently performs an image capturing operation, and thus it is possible to generate two images with different settings. For example, in a state where one image capturing unit (for example, the first image capturing unit 111) is fixed to the wide end, the information processing apparatus 100 can perform an image capturing operation while moving a zoom lens of the other image capturing unit (for example, the second image capturing unit 112) on the basis of a user operation. That is, in the information processing apparatus 100, it is possible to set an image capturing mode capable of simultaneously generating two images of a wide end image and a zoomed image by one image capturing operation.

In addition, the information processing apparatus 100 is provided with other operation members such as a power switch, a mode switching switch, and a zoom button, but they are not shown and described.

The display unit 172 is a display panel that displays various images. As the display unit 172, for example, a touch panel that receives an operation input from the user by detecting a contact operation in the display unit 172.

The shutter button 185 is a button that is pressed by the user when an image of the photographic subject is captured and the generated image (image data) is recorded as an image content (a still image content). For example, when an image capturing mode (for example, still image+still image mode) for recording a still image and the shutter button 185 is half-pressed, a focus control for performing auto focus is performed. In addition, when the shutter button 185 is fully pressed, the focus control is performed, and the image captured by each of the first image capturing unit 111 and the second image capturing unit 112 are associated and recorded on the recording medium at the time of the full pressing.

In addition, the first image capturing unit 111 and the second image capturing unit 112 will be described in detail with reference to FIG. 2.

"Internal Configuration Example of Information Processing Apparatus"

FIG. 2 is a block diagram illustrating an internal configuration of the information processing apparatus 100 according to the first embodiment of the present technique.

The information processing apparatus 100 is provided with a first image capturing unit 111, a second image capturing unit 112, a first signal processing unit 121, a second signal processing unit 122, a resolution conversion unit 131, an image compression and decompression unit 132, and a graphic engine 133. The information processing apparatus 100 is provided with a ROM (Read Only Memory) 140, a RAM (Random Access Memory) 150, and a CPU (Central Processing Unit) 160. The information processing apparatus 100 is provided with a display controller 171, a display unit 172, an input control unit 181, an operation unit 182, a removable media controller 191, a removable medium 192, and an external interface 195. In addition, communication performed among the units constituting the information processing apparatus 100 is performed through a bus 101.

The first image capturing unit 111 and the second image capturing unit 112 convert incident light from a photographic subject to generate an image (image data) on the basis of the control of the CPU 160. In addition, the first image capturing unit 111 and the second image capturing unit 112 generate a left functional image and a right functional image for displaying a stereoscopic image, and an optical system and an image capturing element are configured to be one pair of left and right. That is, each of the first image capturing unit 111 and the second image capturing unit 112 is provided with a zoom lens, a focus lens, a diaphragm, a driving unit thereof, and an image capturing element.

In addition, each configuration (each lens, each image capturing element, and the like) of the first image capturing unit 111 and the second image capturing unit 112 is substantially the same except for difference in disposition. For this reason, hereinafter, description of any one of such left and right configurations is partially omitted.

The first image capturing unit 111 converts the incident light from the photographic subject to generate image data (an image) on the basis of the control of the CPU 160, and supplies the generated image data to the first signal processing unit 121.

The zoom lens constituting the optical system of the first image capturing unit 111 is a lens that moves in the optical axis direction to adjust the focus distance on the basis of the control of the CPU 160. That is, the zoom lens enlarges or contacts the photographic subject included in the image, is a lens that drives forward and backward with respect to the photographic subject, and is a lens for realizing a zoom function.

The focus lens constituting the optical system of the first image capturing unit 111 is a lens that moves in the optical axis to adjust a focus (a focus point) on the basis of the control of the CPU 160. That is, the focus lens is a lens used to focus on a desired target object included in an image, and realizes an auto focus function.

As described above, the zoom lens and the focus lens are a lens group that collects incident light from the photographic subject, and the quantity (light quantity) of the light collected by such a lens group is adjusted by the diaphragm constituting the optical system of the first image capturing unit 111, and the light is input to the image capturing element.

The image capturing element of the first image capturing unit 111 performs a photoelectric conversion process on the incident light passing through the zoom lens, the focus lens, and the diaphragm, and is an image capturing element that supplies an electrical signal (an image signal) subjected to the photoelectric conversion to the first signal processing unit 121. That is, the image capturing element receives the light from photographic subject input through the zoom lens and the focus lens and performs photoelectric conversion, to generate an analog image signal corresponding to the quantity of received light. As the image capturing element, for example, a CCD (Charge Coupled Device) sensor, a CMOS (Complementary Metal Oxide Semiconductor) sensor, and the like may be used.

The first signal processing unit 121 is a signal processing unit that performs various signal processes on the analog image signal supplied from the first image capturing unit 111 on the control of the CPU 160. The first signal processing unit 121 temporarily stores a digital image signal (for example, a left functional image) generated by various signal processes, in the RAM 150.

In addition, the first signal processing unit 121 and the second signal processing unit 122 are substantially the same except that the disposition positions thereof are different. For this reason, the description about the second signal processing unit 122 is omitted.

The resolution conversion unit (Resolution Converter) 131 converts various kinds of input image data into proper resolution by each image process on the basis of the control signal from the CPU 160.

The image compression and decompression unit 132 compresses or decompresses the various input image data according to each image process on the basis of the control signal from the CPU 160. For example, the image compression and decompression unit 132 compresses or decompresses the various input image data into image data of a form of JPEG (Joint Photographic Experts Group) or MPEG (Moving Picture Experts Group). The image compression and decompression unit 132 corresponds to, for example, a JPEG converter or a codec engine.

The graphic engine 133 generates various images displayed on the display unit 172 on the basis of the control of the CPU 160. For example, the graphic engine 133 generates various images (for example, icons in an icon display area 315 shown in FIG. 5 and FIG. 6) relating to the image capturing operation. In addition, when a frame display mode is set during the image capturing operation, the graphic engine 133 generates a frame image (for example, frames 322 and 323 shown in FIG. 6) displayed to be overlapped with a monitoring image. In addition, when a PinP (Picture in Picture) display mode is set during the image capturing operation, the graphic engine 133 performs a mix process of overlapping two images displayed as the monitoring image. For example, an image in the second image display area 312 is overlapped with an image in the first image display area 311 shown in "a" of FIG. 5. Herein, for example, the monitoring image is an image (an image generated using the first image capturing unit 111 and the second image capturing unit 112) display on the display unit 172 during recording of the moving image or during waiting of the recording operation of the still image.

The ROM 140 is a read only memory, and stores various control programs.

The RAM 150 is a memory used as a main memory (a main memory device) of the CPU 160, is provided with a work area of a program performed in the CPU 160, and temporarily stores programs or data necessary to perform various processes by the CPU 160. In addition, the RAM 150 is provided with an image reservation area for various image processes.

The CPU 160 controls the units of the information processing apparatus 100 on the basis of various control programs stored in the ROM 140. In addition, the CPU 160 controls the units of the information processing apparatus 100 on the basis of an operation input received by the operation unit 182. For example, the CPU 160 performs controls such as a zoom control, a focus control, a shutter control, an image recording process, and a mode setting. For example, the CPU 160 generates a control signal of moving the focus lens, thereby performing an AF (Auto Focus) control of detecting a focus position for a predetermined photographic subject. Specifically, the CPU 160 moves the focus lens and performs the auto focus control on the images output from the first signal processing unit 121 and the second signal processing unit 122.

The display unit controller 171 displays various images on the display unit 172 on the basis of the control of the CPU 160. For example, the display unit controller 171 displays various screens (for example, screens shown in FIG. 5 and FIG. 6) on the display unit 172 on the basis of the control of the CPU 160. For example, when the image capturing mode is set, the display unit controller 171 displays the images generated using the first image capturing unit 111 and the second image capturing unit 112 as monitoring images (so-called through-images) on the display unit 172.

The display unit 172 is a display unit that displays various images supplied from the display unit controller 171. For example, the display unit 172 sequentially displays the images generated using the first image capturing unit 111 and the second image capturing unit 112. As the display unit 172, for example, a display panel such as an organic EL (Electro Luminescence) and an LCD (Liquid Crystal Display) may be used. In addition, as the display unit 172, for example, a touch panel capable of performing an operation input through the contact or approach of a finger of a user to a display face may be used.

The input control unit 181 performs a control about an operation input received by the operation unit 182 on the basis of the instruction from the CPU 160.

The operation unit 182 is an operation unit that receives an operation input of the user, and supplies an operation signal corresponding to the received operation input to the CPU 160. For example, the operation unit 182 corresponds to an operation member such as a shutter button 185 (shown in FIG. 1), various operation buttons, various operation dials, a mode setting button, and a zoom button. For example, the mode setting button is an operation member used when a desired image capturing mode is set (when the image capturing mode is switched to the desired image capturing mode). In addition, for example, the zoom button (a W (Wide) button and a T (Tele) button) is an operation member for the zoom operation by the user. In a state where the W button of the zoom button is pressed, the zoom lens is moved to the wide-end side (telescopic side). In a state where the T button is pressed, the zoom lens moves to a tele-end side (wide-angle side). Herein, when a two-lens image capturing mode other than the 3D image capturing mode is set and the zoom operation by the user can be received, only the zoom lens of any one (for example, the second image capturing unit 112) of two image capturing units is moved. In addition, as described above, the display unit 172 and the operation unit 182 may be integrally configured by the touch panel.

The removable media controller 191 is connected to the removable medium 192, and performs reading and recording of data with respect to the removable medium 191 on the basis of the control of the CPU 160. For example, the removable media controller 191 records various image data such as image data generated using the first image capturing unit 111 and the second image capturing unit 112 as image files (image contents), in the removable medium 192. In addition, the removable media controller 191 reads the contents such as the image files from the removable medium 192, and supplies the contents to the RAM 150 or the like through the bus 101.

The removable medium 192 is a recording device that records the image data supplied from the removable media controller 191. In the removable medium 192, various data such as image data of, for example, a JPEG or MPEG form are recorded.

The external interface 195 is connected to an external device (for example, a display device 850) through cables or wirelessly, and performs a communication control performed with respect to the external device on the basis of the instruction from the CPU 160. For example, the external interface 195 is connected to the display device 850 through an inter-device interface 860, and performs inputting and outputting of various kinds of information with respect to the display device 850 on the basis of the control of the CPU 160.

Herein, a case of recording the image generated using the first image capturing unit 111 as the still image content will be described. For example, the image data generated using the first image capturing unit 111 and subjected to a signal process by the first signal processing unit 121 is temporarily stored in the RAM 150. Subsequently, the image data stored in the RAM 150 is converted into a predetermined resolution by the resolution conversion unit 131, and is compressed (JPEG or the like) by the image compression and decompression unit 132. As described above, the resolution-converted and compressed image data is recorded as the still image content (a still image file) in the removable medium 192 by the removable media controller 191. In addition, substantially the same is applied to a case of recording the image generated using the second image capturing unit 112 as the still image content.

In addition, a case of recording the image generated using the first image capturing unit 111 as moving image content will be described. For example, the image data generated using the first image capturing unit 111 and subjected to the signal process by the first signal processing unit 121 is temporarily stored in the RAM 150. Subsequently, the image data stored in the RAM 150 is converted into a predetermined resolution by the resolution conversion unit 131, and is compressed (H.264, MPEG4, or the like) by the image compression and decompression unit 132. As described above, the resolution-converted and compressed image data is recorded as a moving image stream (moving image content) with sound data in the removable medium 192 by the removable media controller 191. In addition, substantially the same is applied to a case of recording the image generated using the second image capturing unit 112 as the moving image content.

In addition, the first image unit 111 and the second image capturing unit 112 are operated to synchronize, and thus it is possible to record the stereoscopic image (the 3D image) as the image content (the stereoscopic image content).

In addition, the first image capturing unit 111 and the second image capturing unit 112 are separately operated, and thus it is possible to simultaneously record two image contents with different zoom magnifications and exposures. Two image contents are, for example, two still image contents with different zoom magnifications, two moving image contents in which the zoom magnifications and frame rates are changed, and a still image content and moving image content. In two image contents recorded as described above, the setting contents of two images generated using the first image capturing unit 111 and the second image capturing unit 112 are different from each other. For this reason, it is preferable that the user be easily able to recognize two images during the image capturing operation. In the first embodiment of the present technique, an example in which the user can easily recognize two images generated using the first image capturing unit 111 and the second image capturing unit 112 during the image capturing operation is described.

"Functional Configuration Example of Image Capturing Apparatus"

FIG. 3 is a block diagram illustrating a functional configuration example of the information processing apparatus 100 in the first embodiment of the present technique.

The information processing apparatus 100 is provided with a first image generating unit 210, a second image generating unit 220, a face detecting unit 230, an operation receiving unit 240, a battery remaining amount detecting unit 250, a display control unit 260, a display unit 172, a recording control unit 270, a content storing unit 280, and a control unit 290.

The first image generating unit 210 and the second image generating unit 220 captures an image of a photographic subject and generate an image on the basis of the control of the control unit 290, and output the generated image to the face detecting unit 230, the display control unit 260, and the recording control unit 270. For example, when the 3D image capturing mode (the first image capturing mode) is set as the two-lens image capturing mode, the first image generating unit 210 and the second image generating unit 220 generate two images for displaying the stereoscopic image. In addition, for example, when an image capturing mode (the second image capturing mode) other than the 3D image capturing mode is set as the two-lens image capturing unit, the first image generating unit 210 and the second image generating unit 220 generate two images (the first image and the second image) for displaying images other than the stereoscopic image. For example, two images (the first image and the second image) are images generated by the first image generating unit 210 and the second image generating unit 220 such that the image capturing ranges are different with respect to the same photographic subjects. Image capturing modes other than the 3D image capturing mode are a still image+still image mode, a moving image+still image mode, and a moving image+moving image mode shown in FIG. 8 and the like. Such modes will be described in detail with reference to FIG. 4. In addition, the first image generating unit 210 corresponds to the first image capturing unit 111 and the first signal processing unit 121 shown in FIG. 2. In addition, the second image generating unit 220 corresponds to the second image capturing unit 112 and the second signal processing unit 122 shown in FIG. 2.

The face detecting unit 230 detects the face of a person included in the image output from the first image generating unit 210 and the second image generating unit 220, and outputs face detection information about the detected face to the control unit 290. As the face detecting method, for example, a face detecting method (for example, Japanese Unexamined Patent Application Publication No. 2004-133637) by matching between a template in which brightness distribution information of faces is recorded and a real image, and a face detecting method based on a part of a sink color included in image data or a characteristic amount of a human may be used. In addition, the face detection information includes a position and a size on the image of the detected face. By the face detection information, it is possible to specify the face image (for example, a rectangular image) including at least a part of the face on the image. In addition, the face detecting unit 230 corresponds to the first signal processing unit 121, the second signal processing unit 122, or the CPU 160 shown in FIG. 2.

The operation receiving unit 240 is an operation receiving unit that receives an operation performed by the user, and outputs a control signal (an operation signal) corresponding to the received operation content to the control unit 290. For example, the operation receiving unit 240 receives an image capturing mode setting operation (an image capturing mode switching operation) of setting a desired image capturing mode. In addition, the operation receiving unit 240 corresponds to the input control unit 181 and the operation unit 182 shown in FIG. 2.

The battery remaining amount detecting unit 250 detects a remaining amount of a battery (not shown) mounted or provided in the information processing apparatus 100, and outputs the detection result (the battery remaining amount information) to the control unit 290. In addition, the battery remaining detecting unit 250 corresponds to the CPU 160 shown in FIG. 2.

The display control unit 260 displays the images output from the first image generating unit 210 and the second image generating unit 220 on the display unit 172 on the basis of the instruction of the control unit 290. For example, the display control unit 260 displays a monitoring image (for example, each image shown in FIG. 8) on the display unit 172 according to the display mode set by the control unit 290 during the image capturing operation. Herein, for example, the display mode set by the control unit 290 is the PinP display mode (the first display mode) or the frame display mode (the second display mode).

Herein, the PinP display mode (the first display mode) is a display mode of simultaneously displaying the two images (the first image and the second image) generated by the first image generating unit 210 and the second image generating unit 220. At the time of setting the PinP display mode, for example, the second image (the image generated by the second image generating unit 220) is overlapped and displayed at a predetermined position on the first image (the image generated by the first image generating unit 210).

In addition, the frame display mode (the second display mode) is a display mode of simultaneously displaying the first image and a relationship of the second image (the image generated by the second image generating unit 220) with the first image (the image generated by the first image generating unit 210). For example, as the relationship of the second image with the first image, a relationship between the image capturing range of the first image capturing unit 111 and the image capturing range of the second image capturing unit 112 with respect to the photographic subject. Specifically, as the image representing the relationship, an additional image (for example, frames 322 and 323 shown in FIG. 6) representing the image capturing range of the second image capturing unit 112 is displayed on the first image.

In addition, the display control unit 260 corresponds to the graphic engine 133 and the display unit controller 171 shown in FIG. 2. In addition, since the display unit 172 corresponds to the display unit 172 shown in FIG. 2, the same reference numerals and signs are given, and the description herein is omitted.

The recording control unit 270 performs a recording control on the content storing unit 280 on the basis of the instruction of the control unit 290. For example, the recording control unit 270 records two images (image data) generated by the first image generating unit 210 and the second image generating unit 220 as the image content (the image file) in the content storing unit 280. In addition, the recording control unit 270 corresponds to the removable media controller 191 shown in FIG. 2.

The content storing unit 280 is a storage unit that stores various kinds of information (still image contents and moving image contents) on the basis of the control of the recording control unit 270. In addition, the content storing unit 280 corresponds to the removable medium 192 shown in FIG. 2.

The control unit 290 controls the units of the information processing apparatus 100 on the basis of various control programs. For example, when the image capturing mode (the second image capturing mode) other than the 3D image capturing mode is set as the two-lens image capturing mode, the control unit 290 performs a control of setting the display mode when displaying the first image (the image generated by the first image generating unit 210). That is, when the first image (the image generated by the first image generating unit 210) is displayed, the control unit 290 performs a control of setting any one of the PinP display mode (the first display mode) and the frame display mode (the second display mode) on a predetermined condition.

For example, when the still image+still image mode is set, the control unit 290 (the predetermined condition), the control unit 290 performs a control of setting the PinP display mode (the first display mode).

In addition, for example, when the low power consumption mode is set (a predetermined condition), the control unit 290 performs a control of setting the frame display mode (the second display mode). Herein, the low power consumption mode is a mode for maintaining the low power consumption state even when the processes are performed in the information processing apparatus 100.

In addition, for example, when the battery remaining amount in the information processing apparatus 100 is smaller than a predetermined value as a reference (the predetermined condition), the control unit 290 performs a control of setting the frame display mode (the second display mode). In this case, the control unit 290 determines whether or not the battery remaining amount in the information processing apparatus 100 is smaller than a predetermined value as a reference on the basis of the battery remaining amount information output from the battery remaining amount detecting unit 250. The PinP display mode and the frame display mode may be set on the basis of combination of such predetermined conditions. In addition, the control unit 290 corresponds to the CPU 160 shown in FIG. 2.

"Display Example at Time of Setting Two-Lens Image Capturing Mode"

FIG. 4 is a diagram illustrating a display example of the display unit 172 when the two-lens image capturing mode is set in the information processing apparatus 100 in the first embodiment of the present technique. In addition, in FIG. 4, as the two-lens image capturing mode, a display example when the image capturing mode other than the 3D image capturing mode is set is show.

Herein, the image capturing mode other than the 3D image capturing mode is, for example, a still image+still image mode, a moving image+still image mode, and a moving image+moving image mode. The still image+still image mode is an image capturing mode for recording two image (the image capturing range (the zoom magnification) of one image is changeable) generated by two image capturing units (the first image capturing unit 111 and the second image capturing unit 112), as the still image content. In addition, the moving image+still image mode is an image capturing mode for recording the image generated by one image capturing unit (for example, the first image capturing unit 111) as the moving image content, and recording the image generated by the other image capturing unit (for example, the second image capturing unit 112) as the still image content. In addition, in the moving image+still image mode, the image capturing range (zoom magnification) of the image recorded as the still image content is changeable. In addition, the moving image+moving image mode is an image capturing mode for recording two images (the image capturing range (the zoom magnification) of one image is changeable) generated by two image capturing units (the first image capturing unit 111 and the second image capturing unit 112) as the moving image content.

In FIG. 4, "a" shows a display configuration example when the PinP display mode is set. The PinP display mode is a display mode of overlapping and displaying the image generated using the second image capturing unit 112, on the image generated using the first image capturing unit 111. For example, in the first image display area 301 in the display unit 172, a wide-end image (for example, the image generated using the first image capturing unit 111) is displayed. Meanwhile, in the second image display area 302 in the display unit 172, the image (for example, the image generated using the second image capturing unit 112) corresponding to the zoom operation is displayed. In addition, "a" of FIG. 4 shows an example in which the whole display area (that is, the whole screen) in the display unit 172 is the first image display area 301, and the lower right area in the display unit 172 is the second image display area 302.

Herein, when the zoom magnification of the second image capturing unit 112 is changed, the size of the second image display area 302 may be changed and may be fixed. In addition, the zoom operation for changing the zoom magnification is performed by an operation input (for example, pressing of the zoom button) in the operation unit 182. A display transition example when the zoom magnification of the second image capturing unit 112 is changed is shown in FIG. 5.

In FIG. 4, "b" shows a display configuration example when the frame display mode is set. The frame display mode is a display mode of overlapping and displaying the frame (the additional image) representing the image capturing range of the image generated using the second image capturing unit 112, on the image generated using the first image capturing unit 111. For example, the image generated using the first image capturing unit 111 is displayed in the first image display area 301 in the display unit 172, and the frame 305 representing the image capturing range of the image generated using the second image capturing unit 112 is overlapped and displayed on the image.

Herein, when the zoom magnification of the second image capturing unit 112 is changed, the image capturing range of the image generated using the second image capturing unit 112 is changed, and thus the frame 305 is enlarged or contracted according to the change. For example, when the user operation (for example, the pressing operation of the T button) for enlarging the zoom magnification is performed, the frame 305 is contracted in the direction of the arrow 308, to be the frame 306 (represented by the dot line). Meanwhile, when the user operation (for example, the pressing operation of the W button) for contracting the zoom magnification is performed, the frame 305 is enlarged in the direction of the arrow 309, to be the frame 307 (represented by the dot line). In addition, when the zoom magnification of the second image capturing unit 112 is the same as the zoom magnification of the first image capturing unit 111, the outside line of the first image display area 301 in the display unit 172 coincides with the frame 305. In addition, a display transition example when the zoom magnification of the second image capturing unit 112 is shown in FIG. 6.

"Display Transition Example at Time of PinP Display Mode"

FIG. 5 is a diagram illustrating a transition example of the PinP display displayed on the display unit 172 according to the first embodiment. In addition, FIG. 5 shows an example of providing an icon display area 315 in which an icon used when the image capturing operation is displayed on the image (the image in the first image display area 311) generated using the first image capturing unit 111. In addition, also in the drawings shown hereinafter, the example of providing the icon display area 315 is shown, hereinafter, the same reference numerals and signs are given, and the description of the icon display area 315 is omitted.

In FIG. 5, "a" shows the image (the image in the first image display area 311) and the image (the image in the second image display area 312) displayed on the display unit 172 when the zoom operation is performed to the wide-side. In FIG. 5, "b" shows the image (the image in the first image display area 311) and the image (the image in the second image display area 313) displayed on the display unit 172 when the zoom operation is performed to the tele-side. In addition, at the time of the actual zoom operation, there is a case where the photographic subject included in the image in the first image display area 311 is moved. However, in FIG. 5, for easy description, before and after the zoom operation, the description is performed in which the same photographic subject is included in the image in the first image display area 311. In addition, also in the image described hereinafter, before and after the zoom operation, the description is performed in which the same photographic subject is included. In addition, FIG. 5 shows an example of a constant size of the display area (the second image display areas 312 and 313) on which the image generated using the second image capturing unit 112 is displayed.

As shown in "a" of FIG. 4, when setting the PinP display mode, the image (the image in the second image display areas 312 and 313) generated using the second image capturing unit 112 is overlapped and displayed on the image (the image in the first image display area 311) generated using the first image capturing unit 111. In addition, the image capturing range generated using the first image capturing unit 111 is constant (fixed to the wide-end). On the contrary, the image capturing range generated using the second image capturing unit 112 is changed according to the zoom operation when the zoom operation is performed by the user. For example, as shown in FIG. 5 by the arrow, the image (the image in the second image display areas 312 and 313) generated using the second image capturing unit 112 is displayed according to the zoom operation performed by the user.

"Display Transition Example at Time of Setting Frame Display Mode"

FIG. 6 is a diagram illustrating a transition example of the frame display displayed on the display unit 172 according to the first embodiment of the present technique.

In FIG. 6, "a" shows the image (the image in the first image display area 321) displayed on the display unit 172 and the frame 322 when the zoom operation is performed to the wide-side. In addition, In FIG. 6, "b" shows the image (the image in the first image display area 321) displayed on the display unit 172 and the frame 323 when the zoom operation is performed to the tele-side.

As shown in "b" of FIG. 4, when setting the frame display mode, the frames 322 and 323 representing the image capturing range of the image generated using the second image capturing unit 112 are overlapped and displayed on the image (the image in the first image display area 321) generated using the first image capturing unit 111. In addition, as shown in "b" of FIG. 4, the image capturing range of the image generated using the first image capturing unit 111 is constant (fixed to the wide-end), but the image capturing range of the image generated using the second image capturing unit 112 is changed according to the zoom operation when the zoom operation is performed by the user. For example, as shown in FIG. 6 by the arrow, the frames 322 and 323 are displayed according to the change of the image capturing range of the image generated using the second image capturing unit 112.

"Data Flow Example at Time of Setting Image Capturing Mode"

FIG. 7 is a diagram schematically illustrating flow of data when setting the image capturing mode of the information processing apparatus 100 according to the first embodiment of the present technique.

In FIG. 7, in the information processing apparatus 100, it is assumed that the two-lens image capturing mode other than the 3D image capturing mode is set. In this case, in the first image capturing unit 111, the image capturing process is performed with the zoom lens fixed to the wide-end. Meanwhile, in the second image capturing unit 112, the image capturing process is performed while the zoom lens moves according to the zoom operation performed by the user.

In FIG. 7, "a" shows an example of flow of data when the moving image+still image mode is set as the image capturing mode, and the PinP display mode is set as the display mode. In this case, in the first image capturing unit 111, the image capturing process 401 of the moving image is performed with the zoom lens fixed to the wide-end. In the second image capturing unit 112, the image capturing process 404 of the still image is performed while the zoom lens moves according to the zoom operation (the zoom process 411) performed by the user.

In the example shown in "a" of FIG. 7, on the image data generated by the image capturing process 401 performed using the first image capturing unit 111, the signal process 402 is performed by the first signal processing unit 121, and the resolution conversion process 403 is performed by the resolution conversion unit 131. In addition, on the image data generated by the image capturing process 404 performed using the second image capturing unit 112, the signal process 405 is performed by the second signal processing unit 122, and the resolution conversion process 406 is performed by the resolution conversion unit 131. On two image data generated as described above, the mix process 407 is performed, and the display process 408 is performed on the image data subjected to the mix process 407 by the display unit controller 171.

Herein, the mix process 407 is performed by the graphic engine 133. In addition, the image data on which the resolution conversion process 403 is performed by the resolution conversion unit 131, and the image in which the resolution conversion process 406 is performed by the resolution conversion unit 131 may be sequentially stored in the RAM 150 to perform the mix process 407.

Herein, when a moving image recording instruction operation is performed, the recording process 410 of the image data (moving image data) is performed. That is, the encoding process 409 is performed on the data subjected to the resolution conversion process 403 by the resolution conversion unit 131, by the image compression and decompression unit 132. Subsequently, the recording process 410 is performed on the image data subjected to the encoding process 409 by the removable media controller 191.

As described above, in the case where the moving image+still image mode is set and the PinP display mode is set, when the recording process 410 of the moving image is performed, the resolution conversion process 406, the mix process 407, and the encoding process 409 are performed. For this reason, the system load becomes high, the power consumption is increased, and the battery capacity is decreased. In addition, the system load becomes high, it is necessary that the system is rich to realize this, and thus there is a worry of connection to a high cost.

In FIG. 7, "b" shows an example of flow of data when the still image+still image mode is set as the image capturing mode and the frame display mode is set as the display mode. Also in this case, in the first image capturing unit 111, the image capturing process 421 of the moving image is performed with the zoom lens fixed to the wide-end. In addition, in the second image capturing unit 112, the image capturing process 424 of the still image is performed while the zoom lens moves according to the zoom operation (the zoom process 430) by the user.

In the example shown in "b" of FIG. 7, on the image data generated by the image capturing process 421 performed using the first image capturing unit 111, the signal process 422 is performed by the first signal processing unit 121, and the resolution conversion process 423 is performed by the resolution conversion unit 131. On the image data generated as described above, the frame adding process 426 is performed according to the zoom operation (the zoom process 430) by the user, and the display process 427 is performed on the image data subjected to the frame adding process 426 by the display unit controller 171. In addition, the frame adding process 426 is performed by the graphic engine 133.

As described above, when setting the frame display mode, the image actually displayed on the display unit 172 is only one image (the image generated using the first image capturing unit 111). For this reason, when setting the frame display mode, it is not necessary to display the image generated using the second image capturing unit 112, and thus it is possible to stop the operation (for example, a reading operation) of the image capturing element of the second image capturing unit 112. Accordingly, it is possible to reduce the system load, and thus it is possible to reduce power consumption. In addition, it is possible to suppress the increase in temperature of the information processing apparatus 100. However, it is necessary to perform the AF (Auto Focus) for the still image capturing operation, and thus the signal process 425 is periodically or non-periodically performed on the image data generated by the image capturing process 424 performed using the second image capturing unit 112, by the second signal processing unit 122. In addition, when the shutter button 185 is pressed by the user (full pressing or half pressing), the image capturing element of the second image capturing unit 112 is operated.

In addition, when setting the frame display mode, it is easy to rapidly recognize the image capturing ranges of the image capturing units (the first image capturing unit 111 and the second image capturing unit 112). However, when the zoom magnification is raised, the frame becomes narrow, and thus there is a worry that the visibility becomes low. In addition, the stereoscopic image (3D image) is an image for obtaining the stereoscopic vision using the parallax of the left and right eyes, and thus a slight deviation occurs in the left functional image and the right functional image in the left and right direction. For this reason, when setting the frame display mode, it is assumed that a slight deviation occurs in the image displayed in the range and the actual image in the left and right direction.

In addition, when setting the PinP display mode, the images generated by the image capturing units (the first image capturing unit 111 and the second image capturing unit 112) are displayed, and thus it is easy to recognize the image capturing ranges of the image capturing units. In addition, when setting the PinP display mode, two images that are recording targets are displayed, and thus, for example, even in a case of high magnification zoom, it is possible to see the image that is the recording target in detail. However, when setting the PinP display mode, it is necessary to perform the process for displaying both images (the images generated using the first image capturing unit 111 and the second image capturing unit 112) on the display unit 172, the system load is high, and there is a worry that the power consumption is increased.

As described above, in the frame display mode, the visibility is low, but the system load is low, and it is possible to reduce the power consumption. Meanwhile, in the PinP display mode, the system load is high, the power consumption is increased, but it is possible to raise the visibility. For this reason, it is important to set the frame display mode and the PinP display mode according to the use circumstance of the information processing apparatus 100.

Herein, in the first embodiment of the present technique, an example of appropriately setting the frame display mode and the PinP display mode according to the use circumstance of the information processing apparatus 100 is described.

"Transition Example of Frame Display Mode and PinP Display Mode"

FIG. 8 is a diagram illustrating a transition example of the frame display and the PinP display displayed on the display unit 172 according to the first embodiment of the present technique.

FIG. 8 shows an example in which the PinP display mode is set only when the still image+still image mode is set as the two-lens image capturing mode (other than the 3D image capturing mode), and the frame display mode is set when the other mode is set. However, even when setting the still image+still image mode, even when the low power consumption mode is set, the frame display mode is set. In addition, even when setting the still image+still image mode (the low power consumption mode is not set), even when the battery remaining amount is small, the frame display mode is set.

That is, FIG. 8 shows an example in which the frame display mode and the PinP display mode are switched when the mode switching of the image capturing mode is switched by the user operation and when the battery remaining amount is smaller than a predetermined value as a reference.

In FIG. 8, “a” shows a transition example when the frame display mode is set. The transition example corresponds to the transition example shown in FIG. 6.

In FIG. 8, “b” shows a transition example when the PinP display mode is set. The transition example corresponds to the transmission example shown in FIG. 5.

For example, when setting the frame display mode (shown in “a” of FIG. 8), when the switching operation to the still image+still image mode is performed, it is possible to switch to the PinP display mode (shown in “b” of FIG. 8) as shown by the arrow 341.

In addition, for example, when setting the display mode (shown in “b” of FIG. 8), when the switching operation to the mode other than the still image+still image mode is performed, it is possible to switch to the frame display mode (shown in “a” of FIG. 8) as shown by the arrow 341. Herein, the mode other than the still image+still image mode is, for example, the moving image+still image mode or the moving image+moving image mode. In addition, similarly to the case of switching to the low power consumption mode, as shown by the arrow 341, it is possible to switch to the frame display mode (shown in “a” of FIG. 8).

In addition, for example, when setting the PinP display mode (shown in “b” of FIG. 8), when the battery remaining amount is smaller than a predetermined value as a reference, it is possible to switch to the frame display mode (shown in “a” of FIG. 8) as shown by the arrow 342.

“Operation Example of Information Processing Apparatus”

FIG. 9 and FIG. 10 are flowcharts illustrating an example of a process step of the display mode setting process performed by the information processing apparatus 100 according to the first embodiment of the present technique.

First, the control unit 290 determines whether or not the setting operation for setting the image capturing mode is performed (Step S901), and when the setting operation for setting the image capturing mode is not performed, the monitoring is continuously performed. When the setting operation for setting the image capturing mode (Step S901), the control unit 290 determines whether or not the set image capturing mode is the two-lens image capturing mode (Step S902).

When the set image capturing mode is not the two-lens image capturing mode (that is, in the case of a 1-eye image capturing mode) (Step S902), the 1-eye image capturing process is performed (Step S903). The control unit 290 determines whether or not the mode switching operation of the image capturing mode is performed (Step S904), and when the mode switching operation of the image capturing mode is performed, the process returns to Step S902. When the mode switching operation of the image capturing mode is not performed (Step S904), the control unit 290 determines whether or not the image capturing mode end operation is performed (Step S905). When the image capturing mode end operation is not performed, the process returns to Step S903. Meanwhile, when the image capturing mode end operation is performed (Step S905), the image capturing mode end process is performed (Step S923), and the operation of the display mode setting process is ended.

In addition, when the set image capturing mode is the two-lens image capturing mode (Step S902), the control unit 290 determines whether or not the set image capturing mode is the 3D image capturing mode (Step S906). When the set image capturing mode is the 3D image capturing mode (Step S906), the 3D image capturing process is performed (Step S907). The control unit 290 determines whether or not the mode switching operation of the image capturing mode is performed (Step S908), and when the mode switching operation of the image capturing mode is performed, the process returns to Step S902. When the mode switching operation of the image capturing mode is not performed (Step S908), the control unit 290 determines whether or not the image capturing mode end operation is performed (Step S909), and when the image capturing mode end operation is not performed, the process returns to Step S907). Meanwhile, when the image capturing mode end operation is performed (Step S909), the image capturing mode end operation is performed (Step S923), and the operation of the display mode setting process is ended.

In addition, when the set image capturing mode is not the 3D image capturing mode (Step S906), the control unit 290 determines whether or not the set image capturing mode is the still image+still image mode (Step S910). When the set image capturing mode is not the still image+still image mode (Step S910), the control unit 290 determines whether or not the set image capturing mode is the moving image+still image mode (Step S911). When the set image capturing mode is not the moving image+still image mode (that is, the moving image+moving image mode) (Step S910), the control unit 290 performs a control for setting the moving image+moving image mode (Step S912). Subsequently, the frame display mode is set, and the frame display process is performed (Step S916). For example, the frame display process shown in FIG. 6 and “a” of FIG. 8 is performed. In addition, Step S916 is an example of the second controlling step described in Claims.

In addition, when the set image capturing mode is the moving image+still image mode (Step S910), the control unit 290 performs a control for setting the moving image+still image mode (Step S913). Subsequently, the frame display mode is set, and the frame display process is performed (Step S916).

In addition, when the set image capturing mode is the still image+still image mode (Step S910), the control unit 290 performs a control for setting the still image+still image mode (Step S914). Subsequently, the control unit 290 determines whether or not the low power consumption mode is set (Step S915), and when the low power consumption mode is set (Step S915), the frame display mode is set, and the frame display process is performed (Step S916). Meanwhile, when the low power consumption mode is not set (Step S915), the PinP display mode is set, and the PinP display process is performed (Step S924). For example, the PinP display process shown in FIG. 5 and “b” of FIG. 8 is performed. In addition, Step S924 is an example of the first controlling step described in Claims.

In addition, the control unit 290 determines whether or not the user operation is performed (Step S917), and when the user operation is not performed, the process returns to Step S916. Meanwhile, when the user operation is performed (Step S917), the control unit 290 determines whether or not the user operation is the mode switching operation of the image capturing mode (Step S918), and when it is the mode switching operation of the image capturing mode, the process returns to Step S902.

In addition, when it is not the mode switching operation of the image capturing mode (Step S919), the control unit 290 determines whether or not the user operation is the zoom operation (Step S919). When it is the zoom operation (Step S919), the control unit 290 performs a control or changing the position of the frame that is the display target according to the zoom operation (Step S920), and the process returns to Step S916. Meanwhile, when it is not the zoom operation (Step S919), the control unit 290 determines whether or not the user operation is the image capturing mode end operation (Step S921). When it is not the image capturing mode end operation (Step S921), the process corresponding to the user operation is performed (Step S922), and the process returns to Step S916. Meanwhile, when it is the image capturing mode end operation (Step S921), the image capturing mode end process is performed (Step S923), and the operation of the display mode setting process is ended.

In addition, the control unit 290 determines whether or not the battery remaining amount is equal to or smaller than a predetermined value (Step S925), and when the battery remaining amount is equal to or smaller than the predetermined value, the process proceeds to Step S916. Meanwhile, when the battery remaining amount is not equal to or smaller than the predetermined value (Step S925), it is determined whether or not the user operation is performed (Step S926), and when the user operation is not performed, the process returns to Step S924. Meanwhile, when the user operation is performed (Step S926), the control unit 290 determines whether or not the user operation is the mode switching operation of the image capturing mode (Step S927), and when it is the mode switching operation of the image capturing mode, the process returns to Step S902.

In addition, when it is not the mode switching operation of the image capturing mode (Step S927), the control unit 290 determines whether or not the user operation is the zoom operation (Step S928), and when it is the zoom operation, the process returns to Step S924. Meanwhile, when it is not the zoom operation (Step S928), the control unit 290 determines whether or not the user operation is the image capturing mode end operation (Step S929). When it is not the image capturing mode end operation (Step S929), the process corresponding to the user operation is performed (Step S930), and the process returns to Step S924. Meanwhile, when it is the image capturing mode end operation (Step S929), the image capturing mode end process is performed (Step S923), and the operation of the display mode setting process is ended. In addition, Steps S901, S902, S906, S910 to S915, and S925 are an example of the selecting step described in Claims.

As described above, according to the first embodiment, it is possible to appropriately set the frame display mode and the PinP display mode according to the user circumstance of the information processing apparatus 100. In this case, it is not necessary to perform the operation about the setting of the display mode, and thus it is possible to reduce the load of the user at the time of the image capturing operation. In addition, it is possible to sequentially provide the optimal monitoring display even when the user does not perform the operation about the setting of the display mode. That is, it is possible to maintain the visibility of the plurality of images, the load (the system load) of the process when the image display is reduced, and it is possible to suppress the power consumption. In addition, it is possible to suppress the increase in temperature of the information processing apparatus 100 according to the reduction of the system load.

2. Second Embodiment

In the first embodiment of the present technique, the example of setting the frame display mode when setting the moving image mode (the moving image+still image mode and the moving image+moving image mode) has been described. However, even when setting the moving image mode (the moving image+still image mode and the moving image+moving image mode), when the moving image recording operation is not performed (that is, the moving image recording instruction operation is not performed), it is assumed that the system load is low.

In the second embodiment of the present technique, even when setting the moving image mode (the moving image+moving image mode), when the moving image recording operation is not performed, an example of setting the PinP display mode is described. In addition, the configuration of the information processing apparatus according to the second embodiment of the present technique is substantially the same as the example shown in FIG. 1 to FIG. 3. For this reason, a part of the description about the part common with the first embodiment of the present technique is omitted.

"Transition Example of Frame Display Mode and PinP Display Mode"

FIG. 11 is a diagram illustrating a transition example of the frame display and the PinP display displayed on the display unit 172 according to the second embodiment of the present technique.

FIG. 11 shows an example in which the frame display mode is set only when setting the lower power consumption mode, and the PinP display mode is set when setting the other mode. However, when setting the moving image+moving image mode or the moving image+still image mode, when the moving image recording operation is started (that is, when the moving image instruction operation is performed), the frame display mode is set. In addition, when setting the moving image+moving image mode or the moving image+still image mode, when the moving image recording operation is ended (that is, when the moving image recording end operation is performed), the PinP display mode is set.

That is, FIG. 11 shows an example in which the frame display mode and the PinP display mode are switched when the mode switching of the image capturing mode is performed by the user operation, when the moving image recording instruction operation is performed, and when the moving image recording end operation is performed.

In FIG. 11, "a" shows a transition example when the frame display mode is set. The transition example corresponds to the transition example shown in FIG. 6.

In FIG. 11, "b" shows a transition example when the PinP display mode is set. The transition example corresponds to the transmission example shown in FIG. 5.

For example, when setting the frame display mode (shown in "a" of FIG. 11), when the release operation of the lower power consumption mode is performed, it is possible to switch to the PinP display mode (shown in "b" of FIG. 11) as shown by the arrow 351. Meanwhile, when setting the PinP display mode (shown in "b" of FIG. 11), when the setting operation of the lower power consumption is performed, it is possible to switch to the frame display mode (shown "a" of FIG. 11) as shown by the arrow 351.

In addition, when setting the PinP display mode (when setting the moving image+moving image mode or the moving image+still image mode) (shown in "b" of FIG. 11), when the moving image recording instruction operation is performed, it is possible to switch to the frame display mode (shown in "a" of FIG. 11) as shown by the arrow 352. Meanwhile, when setting the frame display mode (when setting the moving image+moving image mode or the moving image+still image mode) (shown in "a" of FIG. 11), when the moving image recording end operation is performed, it is possible to switch to the PinP display mode (shown in "b" of FIG. 11) as shown by the arrow 353.

"Operation Example of Information Processing Apparatus"

FIG. 12 and FIG. 13 are flowcharts illustrating an example of a process step of the display mode setting process performed by the information processing apparatus 100 according to the second embodiment of the present technique. In addition, since FIG. 12 and FIG. 13 are modification examples of FIG. 9 and FIG. 10, the same reference numerals and signs are given to the part common with FIG. 9 and FIG. 10, and a part of the description thereof is omitted.

After setting the still image+still image mode (Step S914), the control unit 290 determines whether or not the low power consumption mode is set (Step S931). When the low power consumption mode is set (Step S931), the frame display mode is set, and the frame display process is performed (Step S940). Meanwhile, when the low power consumption mode is not set (Step S931), the PinP display mode is set, and the PinP display process is performed (Step S932).

Subsequently, the control unit 290 determines whether or not the user operation is performed (Step S933), and when the user operation is not performed, the process returns to Step S932. Mean while, when the user operation is performed (Step S933), the control unit 290 determines whether or not the user operation is the mode switching operation of the image mode (Step S934), and when it is the mode switching operation of the image capturing mode, the process returns to Step S902.

In addition, when it is not the mode switching operation (Step S934), the control unit 290 determines whether or not the user operation is the zoom operation (Step S935), and when it is the zoom operation, the process returns to Step S932. Meanwhile, when it is not the zoom operation (Step S935), the control unit 290 determines whether or not the user operation is the moving image recording start operation (Step S936).

When it is the moving image recording start operation (Step S936), the process proceeds to Step S940. Meanwhile, when it is not the moving image recording start operation (Step S936), the control unit 290 determines whether or not the user operation is the image capturing mode end operation (Step S937). When it is not the image capturing mode end operation (Step S937), the process corresponding to the user operation (Step S938), and the process returns to Step S932. Meanwhile, when it is the image capturing mode end operation (Step S937), the image capturing mode end process is performed (Step S939), the operation of the display mode setting process is ended.

In addition, the control unit 290 determines whether or not the user operation is performed (Step S941), and when the user operation is not performed, the process returns to Step S940. Meanwhile, when the user operation is performed (Step S941), the control unit 290 determines whether or not the user operation is the moving image recording end operation (Step S942). When it is the moving image recording end operation (Step S942), the process proceeds to Step S932. Meanwhile, when it is not the moving image recording end operation (Step 942), the control unit 290 determines whether or not the user operation is the image capturing mode end operation (Step S943), and when it is the mode switching operation of the image capturing mode, the process returns to Step S902.

In addition, when it is not the mode switching operation of the image capturing mode (Step S943), the control unit 290 determines whether or not the user operation is the zoom operation (Step S944). When it is the zoom operation (Step S944), the control unit 290 performs a control for changing the position of the frame that is the display target according to the zoom operation (Step S945), and the process returns to Step S940. Meanwhile, when it is not the zoom operation (Step S944), the control unit 290 determines whether or not the user operation is the image capturing mode end operation (Step S946). When it is not the image capturing mode end operation (Step S946), the process corresponding to the user operation is performed (Step S947), and the process returns to Step S940. Meanwhile, when it is the image capturing mode end operation (Step S946), the image capturing mode end operation is performed (Step S939), the operation of the display mode setting process is ended.

As described above, when the recording process for recording at least one of the first image and the second image as the moving image content, the control unit 290 is performed (the predetermined condition), the control unit 290 performs a control of setting the second display mode. In addition, the first image is the image generated by the first image generating unit 210, and the second image is the image generated by the second image generating unit 220.

As described above, in the second embodiment of the present technique, except for the time of setting the low power consumption mode, the PinP display mode is set, but when the moving image recording process is started, the frame display mode is set to lower the system load. Accordingly, it is possible to maintain the visibility of the plurality of images, and thus it is possible to reduce the load of the process at the time of the image displaying.

Herein, just before the moving image recording start operation, or just after the moving image recording end operation, rapid switching of the PinP display mode and the frame display mode is performed. As described above, when the rapid switching is performed, it is assumed that the user does not see easily the photographic subject at the time of the switching. Therein, when switching of the PinP display mode and the frame display mode, the image in the second image display area and range is smoothly moved by animation, and thus the user easily see the photographic subject at the time of the switching. As described above, the example in which the switching of the PinP display mode and the frame display mode is performed using the animation will be described in the fourth embodiment of the present technique.

3. Third Embodiment

In the first embodiment of the present technique, the example of setting the PinP display mode when setting the still image+still image mode has been described. However, even when setting the still image+still image mode, when the zoom magnification of the image that is the display target is relatively low, it is assumed that it is possible to secure regular visibility.

In the third embodiment of the present technique, even when setting the still image+still image mode, when a predetermined condition is satisfied, an example of setting the frame display mode is described. In addition, the configuration of the information processing apparatus according to the third embodiment of the present technique is substantially the same as the example shown in FIG. 1 to FIG. 3. For this reason, a part of the description about the part common with the first embodiment of the present technique is omitted.

"Transition Example of Frame Display Mode and PinP Display Mode"

FIG. 14 is a diagram illustrating a transition example of the frame display and the PinP display displayed on the display unit 172 according to the third embodiment of the present technique. In addition, "a" of FIG. 14 is the same as the "a" of FIG. 8, and thus the detailed description herein is omitted.

FIG. 14 shows an example in which the frame display mode is set when the predetermined condition is satisfied even at the time of setting the still image+still image mode. In addition, the other points are the same as the example shown in FIG. 8, and thus a part of the description about the part common with the example shown in FIG. 8 is omitted.

That is, FIG. 14 shows an example in which the frame display mode and the PinP display mode are switched according to whether or not the predetermined condition is satisfied when setting the still image+still image mode.

In FIG. 14, "b" shows a transition example when the frame display mode or the PinP display mode is set according to the zoom magnification.

For example, when setting the frame display mode (shown in "a" of FIG. 14), when the switching operation to the still image+still image mode is performed, as showed by the arrow 361, it is possible to switch to the frame display mode or the PinP display mode (shown in "b" of FIG. 14) corresponding to the zoom magnification.

In addition, for example, when setting the frame display mode or the PinP display mode (shown in "b" of FIG. 14), when the switching operation to the mode other than the still image+still image mode is performed, as shown by the arrow 361, it is possible to switch to the frame display mode (shown in "a" of FIG. 8). In addition, even when the switching operation to the low power consumption mode is performed, as shown by the arrow 361, it is possible to switch to the frame display mode (shown in "a" of FIG. 8).

Herein, when setting the still image+still image mode, a predetermined condition that is a reference when switching the frame display mode and the PinP display mode will be described. For example, the predetermined condition may be a case where the zoom magnification is higher than a predetermined value (for example, three times to four times) as a reference. In addition, the predetermined condition is a case where the main photographic subject (for example, the face of a person) is present in the range when setting the frame display mode, the display mode is switched to the PinP display mode, and it is possible to improve the visibility of the main photographic subject. For example, when the size of the main photographic subject (for example, the face of a person) included in the range when setting the frame display mode is smaller than a predetermined size, it is thought that the visibility of the main photographic subject is improved when the display mode is switched to the PinP display mode. Herein, for example, the predetermined size may be the size (for example, a length of a face) of the main photographic subject when setting the PinP display mode. That is, when the size (for example, a length of a face) of the main photographic subject when setting the frame display mode is smaller than the size (for example, a length of a face) of the main photographic subject when setting the PinP display mode, it is possible to switch the PinP display mode.

As described above, the example shown in FIG. 14 is an example in which the frame display mode is set even when setting any image capturing mode when the zoom magnification is lower than a predetermined value as a reference, but the PinP display mode is automatically set according to whether or not the predetermined condition is satisfied in the still image+still image mode.

"Operation Example of Information Processing Apparatus"

FIG. 15 is a flowchart illustrating an example of a process step of the display mode setting process performed by the information processing apparatus 100 according to the third embodiment of the present technique. In addition, since FIG. 15 is a modification example of FIG. 9 and FIG. 10, the same reference numerals and signs are given to the part common with FIG. 9 and FIG. 10, and a part of the description thereof is omitted.

When the user operation is the zoom operation (Step S919), the control unit 290 determines whether or not the low power consumption mode is set (Step S951), and when the low power consumption mode is set (Step S951), the process proceeds to Step S920. Meanwhile, when the lower power consumption mode is not set (Step S951), the control unit 290 determines whether or not the zoom magnification is equal to or more than a predetermined value (Step S952), and when the zoom magnification is equal to or more than the predetermined value, the process proceeds to Step S924.

In addition, the zoom magnification is not equal to or more than the predetermined value (that is, when the zoom magnification is less than the predetermined value) (Step S952), the control unit 290 determines whether or not the main photographic subject is present in the range displayed on the display unit 172 (Step S953). When the main photographic subject is present in the range displayed on the display unit 172 (Step S953), the control unit 290 switches to the PinP display mode, thereby determining whether or not it is possible to improve the visibility of the main photographic subject (Step S954). That is, the size S1 of the main photographic subject in the second image display area when setting the PinP display mode is compared with the size S2 of the main photographic subject in the range when setting the frame display mode, and it is determined whether or not S1>S2 (Step S954). When it is S1>S2 (Step S954), the process proceeds to Step S924, and when it is not S1>S2 (that is, S1 is less than or equal to S2) (Step S954), the process proceeds to Step S920.

In addition, when the user operation is not the zoom operation (Step S928), the control unit 290 determines whether or not the zoom magnification is less than a predetermined value (Step S955), and when the zoom magnification is not less than the predetermined value, the process proceeds to Step S929.

In addition, when the zoom magnification is less than the predetermined value (Step S955), the control unit 290 determines whether or not the main photographic subject is present in the second image display area displayed on the display unit 172 (Step S956).

When the main photographic subject is present in the second image display area (Step S956), the control unit 290 determines whether or not S1 is larger than S2 (Step S957).

That is, it is determined whether or not S1>S2 (Step S957). When it is S1>S2 (Step S957), the process proceeds to Step S929, and when it is not S1>S2 (that is, S1 is less than or equal to S2) (Step S957), the process proceeds to Step S916.

Herein, in the predetermined value (N) in Steps S952 and S955, the same value may be used, and different values may be used. For example, when the zoom magnification is in the vicinity of the boundary of the predetermined value (N), it is assumed that the PinP display mode and the frame display mode are frequently changed for a short time. To prevent the display mode from being frequently changed, the predetermined value in Step S955 may be a value (for example, N−1) smaller than the predetermined value (N) in Step S952. Similarly, for example, when the size of the main photographic subject is in the vicinity of the boundary of the conversion, it is assumed that the PinP display mode and the frame display mode are frequently changed for a short time. To prevent the display mode from being frequently changed, the determination standard of S1 and S2 may be eased to a regular condition.

As described above, when the zoom magnification of the optical system relating to the second image capturing unit 112 is larger than a predetermined value as a reference (a predetermined condition), the control unit 290 performs a control of setting the PinP display mode (the first display mode). In addition, when the main photographic subject is included in the image (the second image) generated using the second image capturing unit 112 (a predetermined condition), the control unit 290 performs a control of setting the PinP display mode (the first display mode).

In addition, when the main photographic subject is included in the second image and when the display size of the main photographic subject is larger than the display size of the main photographic subject included in the first image as a reference (a predetermined condition), the control unit 290 performs a control of setting the PinP display mode (the first display mode). In addition, the first image is the image generated using the first image capturing unit 111.

As described above, in the third embodiment of the present technique, even when setting the still image+still image mode, when the predetermined condition is satisfied, the frame display mode is set to lower the system load. Accordingly, it is possible to maintain the visibility of the plurality of images, and thus it is possible to further reduce the load of the process at the time of the image displaying.

4. Fourth Embodiment

In the first embodiment to the third embodiment of the present technique, the example in which the switching is momentarily changed when the switching of the frame display mode and the PinP display mode is performed has been described. However, when the position and the size of the frame when setting the frame display mode are greatly different from the position and the size of the second image display area when setting the PinP display mode, it may be assumed that the user does not easily see the image before and after the switching.

Therein, in the fourth embodiment of the present technique, when the switching of the frame display mode and the PinP display mode is performed, an example in which the image (the image in the range, and the image in the second image display area) before and after the switching is moved by animation is described. In addition, the configuration of the information processing apparatus according to the fourth embodiment of the present technique is substantially the same as the example shown in FIG. 1 to FIG. 3. For this reason, a part of the description about the part common with the first embodiment of the present technique is omitted.

"Display Transition Example by Animation"

FIG. 16 is a diagram illustrating a transition example from the frame display displayed on the display unit 172 to the PinP display according to the fourth embodiment of the present technique.

In FIG. 16, "a" shows the image (the image the first image display area 321) and the frame 322 displayed when setting the frame display mode. In addition, "a" of FIG. 16 is the same as the example shown in "a" of FIG. 6, and thus the detailed description herein is omitted.

In FIG. 16, "b" shows the images 501 to 504 displayed when switching from the frame display mode and the PinP display mode.

The image (the image in the first image display area 321) and the frame 322 shown in "a" of FIG. 16 are displayed on the display unit 172, it is assumed that it is the switching timing from the frame display mode to the PinP display mode. In this case, the display control unit 260 displays the image (the image generated using the second image capturing unit 112) with the same size as the size of the frame 322 at the position of the frame 322 displayed on the display unit 172. In this case, it is assumed that the photographic subject in the frame 322 displayed on the display unit 172 and the photographic subject included in the image generated using the second image capturing unit 112 are substantially the same except for left and right deviation based on the parallax.

Subsequently, when switching from the frame display mode to the PinP display mode, the display control unit 260 is moved and displays the image generated using the second image capturing unit 112 by animation. That is, the display control unit 260 moves and displays the image generated using the second image capturing unit 112 by animation, from the frame 322 shown in "a" of FIG. 16 to the second image display area (the area of the image 504) shown in "b" of FIG. 16. In addition, "b" of FIG. 16 schematically shows the images 501 and 503 sequentially moved by the animation by a rectangle of the dot line.

As described above, the control unit 290 performs a control of moving and animation-displaying the image (the second image) generated using the second image capturing unit 112 in the PinP display mode (the first display mode) and the frame display mode (the second display mode). That is, the display control unit 260 performs the animation-displaying on the basis of the control of the control unit 290. Specifically, the display control unit 260 moves and animation-displays the second image between the position of the second image displayed when setting the PinP display mode and the position specified by the additional image (the frame) displayed on the first image when setting the frame display mode. In addition, the first image is the image generated using the first image capturing unit 111.

In addition, in "b" of FIG. 16, for convenience of description, the interval of the animation is relatively broad, but the internal of the animation is may be appropriately changed. In addition, "b" of FIG. 16 shows the example of contracting and linearly moving the image generated using the second image capturing unit 112, but the image may be moved by a trace (for example, a curved shape) other than the straight line while contracting the image generated using the second image capturing unit 112.

Herein, as shown in "a" of FIG. 16, the image (the image in the first image display area 321) displayed on the display unit 172 includes faces of a plurality of persons. For example, the lower right part of the image in the first image display area 321 includes a person 505 who cheers sports. However, as shown in "b" of FIG. 16, when the image generated using the second image capturing unit 112 is moved by animation and is displayed on the second image display area (the area of the image 504), the face of the person 500 is hidden by the image 504. Generally, it is though that the interest of the user is high on the face of the person, and thus it is assumed that it is important to confirm the face of the person during the image capturing operation. Hereinafter, an example of changing the movement destination of the image or the size of the image considering the photographic subject of the movement destination of the image and the photographic subject (the main photographic subject) included in the image capturing range is described.

"Disposition Example of Second Image Display Area"

FIG. 17 is a diagram illustrating an example of a candidate of disposing the second image display area in the display area of the display unit 172 according to the fourth embodiment of the present technique.

Herein, FIG. 17 shows an example of providing the icon display area 514 in which the icon used when the image capturing operation is displayed, at the left upper corner in the display area of the display unit 172. For this reason, FIG. 17 shows the first candidate area 511 to the third candidate area 513 of the left lower corner, the right upper corner, and right lower corner in the display area of the display unit 172, as the candidate of disposing the second image display area in the display area of the display unit 172.

For example, when switching from the frame display mode to the PinP display mode, the control unit 290 determines moving the display target image of the second image display area to the first candidate area 511. However, when the face of the person is detected in the first candidate area 511 (including a case of overlapping a part of the face with the first candidate area 511), the control unit 290 determines moving the display target image of the second image display area to the second candidate area 512. However, it is assumed that the face of the person is detected from the inside of the second candidate area 512. As described above, when the face of the person is detected in the second candidate area 512 (including a case of overlapping a part of the face with the second candidate area 512), the control unit 290 determines moving the display target image of the second image display area to the third candidate area 513.

Herein, for example, it is assumed that the face of the person is detected from the inside of any area of the first candidate 511 to the third candidate area 513. In this case, the candidate in which the number of detected faces is smallest may be determined as the disposition area of the second image display area. Alternatively, the other area other than the first candidate area 511 to the third candidate area 513 may be determined as the disposition area of the second image display area. For example, an intermediate area between the first candidate area 511 and the third candidate area 513 and an intermediate area between the first candidate area 511 and the second candidate area 512 may be determined as the disposition area of the second image display area.

In addition, for example, when the face of the person included in the image displayed in the second image display area when setting the PinP display mode is smaller than the face of the person included in the image displayed in the first image display area, it is assumed that the face of the person is not easily seen. Therein, when the face of the person displayed in the second image display area is smaller than the face of the person displayed in the first image display area, the size of the second image display area is enlarged, and it is possible to easily see the face of the person. Therein, such an example is shown in FIG. 18 and FIG. 19.

"Display Transition Example by Animation"

FIG. 18 and FIG. 19 are diagrams illustrating a transition example from the frame display displayed on the display unit 172 to the PinP display according to the fourth embodiment of the present technique.

In FIG. 18, "a" shows the image 521 and the image 522 displayed when switching from the frame display mode to the PinP display mode. In FIG. 18, "b" shows a transition example of the images (the images 524 to 526) when the second image display area is moved by animation. In addition, since the transition example shown in "a" of FIG. 18 and "b" of FIG. 18 is substantially the same as the example shown in FIG. 16, the detailed description herein is omitted.

In FIG. 18, "c" shows a state where the face of the person is included in the first candidate area 511 when the display target image of the second image display area is moved to the first candidate area 511. In "c" of FIG. 18, the face of the person 505 detected by the face detecting unit 230 is represented by the rectangular frame 529. As described above, a part or the whole of the face of the person 505 detected by the face detecting unit 230 is overlapped with the first candidate area 511 (the movement destination of the image 528), the control unit 290 determines moving the second image display area to the other candidate area. In "c" of FIG. 18, the face of the person 505 is overlapped with the first candidate area, and thus it is determined as the second candidate area.

In FIG. 19, "a" shows a transition example of the image when the images 531 to 533 are moved to the second candidate area 512 by animation. In "c" of FIG. 18 and "a" of FIG. 19, it is assumed that the display target image moved toward the first candidate area 511 is moved toward the second candidate area 512 during the movement. In addition, in "a" of FIG. 19, the images 531 and 532 sequentially moved by animation are schematically shown by a dot line rectangle.

As described above, in the fourth embodiment of the present technique, the area where the main photographic subject (for example, the face of a person) is not present may be the second image display area.

Herein, as shown in "a" of FIG. 19, it is assumed that the zoom operation is performed by the user in a state where the second image display area (the image 533) is set in the right upper corner of the image in the first image display area. The display example after the zoom operation is shown in "b" of FIG. 19.

In FIG. 19, "b" shows a display example of the image 535 in the second image display area set in the second candidate area 512. In "b" of FIG. 19, the face (surrounded by the dot line frame 536) of the person is detected from the image 535. As described above, when the face of the person is detected from the image 535 in the second image display area and when a predetermined condition is satisfied, and the second image display area is enlarged, to improve the visibility of the face. Herein, the predetermined condition is a case where the size of the face when detecting the face of the image in the second image display area is smaller than a predetermined size. Herein, for example, the predetermined size may be the size (for example, a length of a face) of the face in the first image display area when detecting the face. The modification example of the size is shown in "c" of FIG. 19.

In FIG. 19, "c" shows a transition example when the size of the image 538 in the second image display area set in the second candidate area 512 is changed by animation. In addition, in "c" of FIG. 19, the images 538 and 539 sequentially enlarged by animation are schematically shown by dot line rectangles. As described above, the second image display area is sequentially enlarged by animation, the image 540 is displayed, and thus it is possible to improve the visibility of the face.

As described above, when setting the PinP display mode (the first display mode), when the main photographic subject is included in the first image, the control unit 290 performs a control of changing the display position of the second image so as not to overlap the main photographic subject with the second image. In addition, the first image is the image generated using the first image capturing unit 111, and is the image displayed in the first image display area. In addition, the second image is the image generated using the second image capturing unit 112, and is the image displayed in the second image display area.

In addition, when setting the PinP display mode (the first display mode), when the main photographic subject is included in the second image, the control unit 290 performs a control of changing the size of the second image such that the size of the main photographic subject is a predetermined size.

As described above, in the fourth embodiment of the present technique, when switching the frame display mode and the PinP display mode, they are smoothly changed by animation. Accordingly, it is possible to prevent the photographic subject from being lost before and after the switching. In addition, when the image in the second image display area is overwritten and the main photographic subject is present before the movement of the second image display area so as not to be hidden by the second image display area, the second image display area is changed. In addition, when the main photographic subject is detected from the image in the second image display area, the size of the second image display area is changed, and it is possible to improve the visibility of the face.

"Operation Example of Information Processing Apparatus"

FIG. 20 and FIG. 21 are flowcharts illustrating an example of a process step of the PinP display process performed by the information processing apparatus 100 according to the fourth embodiment of the present technique. The process step is a process step corresponding to the PinP display process (Step S924) shown in FIG. 10 and FIG. 15, and the PinP display process (Step S932) shown in FIG. 13.

First, the control unit 290 determines whether or not it is just after the change from the frame display mode to the PinP display mode (Step S961), and when it is not just after the change from the frame display mode to the PinP display mode, the PinP display is performed at a predetermined position and a predetermined size (Step S962).

That is, the PinP display is performed at the position and the size of the second image display area displayed just before it (Step S962).

In addition, when it is just after the change from the frame display mode to the PinP display mode (Step S963), the PinP display is performed at the position and the size of the frame overlapped and displayed on the image in the first image display area (Step S963). That is, the PinP display mode in which the position and the size of the frame displayed just before the switching are the position and the size of the second image display area is set (Step S963).

Subsequently, the control unit 290 starts moving the display target image of the second image display area by animation, toward the first candidate area (for example, the first candidate area 511 shown in FIG. 17) (Step S964).

Subsequently, the control unit 290 determines whether or not the position and the size of the second image display area are being changed (Step S965). When the position and the size of the second image display area are being changed (Step S965), the control unit 290 acquires the position and the size of the second image display area after the change (Step S966). Subsequently, the control unit 290 determines whether or not the second image display area after the change is overlapped with the main photographic subject in the first image display area (Step S967).

When the second image display area after the change is overlapped with the main photographic subject in the first image display area (Step S967), the control unit 290 acquires the position and the size of the next candidate area (Step S968). Subsequently, the control unit 290 starts moving the display target image of the second image display area by animation, toward the candidate area (for example, the second candidate area 512 shown in FIG. 17) (Step S969).

Subsequently, the control unit 290 determines whether or not the change (the movement or the size change) of the second image display area is ended (Step S970), and when the change of the second image display area is not ended, the operation of the PinP display process is ended. In addition, when the change of the second image display area is ended (Step S970), the animation process of the second image display area is ended (Step S971), and the operation of the PinP display process is ended.

In addition, when the position and the size of the second image display area are not being changed (Step S965), the position and the size of the current second image display area are acquired (Step S972). Subsequently, the control unit 290 determines whether or not the current second image display area is overlapped with the main photographic subject in the first image display area (Step S973). When the current second image display area is overlapped with the main photographic subject in the first image display area (Step S973), the process proceeds to Step S968.

When the current second image display area is not overlapped with the main photographic subject in the first image display area (Step S973), the control unit 290 determines whether or not the main photographic subject is included in the second image display area (Step S974). When the main photographic subject is not included in the second image display area (Step S974), the operation of the PinP display process is ended.

When the main photographic subject is included in the second image display area (Step S974), the control unit 290 determines whether or not the size S3 of the main photographic subject included in the second image display area is larger than the size S4 of the main photographic subject when setting the frame display mode (Step S975). That is, the size S3 of the main photographic subject in the second image display area when setting the PinP display mode is compared with the size S4 of the main photographic subject in the range when setting the frame display mode, and it is determined whether or not it is S3>S4 (Step S975). When it is S3>S4 (Step S975), the operation of the PinP display process is ended.

In addition, when it is not S3>S4 (Step S975), the control unit 290 acquires the size of the second image display area in which S3 is larger than S4 (Step S976). For example, it is possible to calculate the size of the second image display area on the basis a preset magnification (for example, 2.1 times). Alternatively, the control unit 290 may calculate the size of the second image display area on the basis of S3 and S4. In addition, the upper limit of the size of the second image display area may be set, and the size of the second image display area may be set so as not to exceed the upper limit.

Subsequently, the control unit 290 starts changing of the image in the second image display area by animation to be the acquired size (Step S977).

"Example of Movement Standard and Enlargement Standard of Second Image Display Area"

The example of determining whether the movement or the size change of the second image display area is necessary or unnecessary on the basis of the presence of the face of the person or the size thereof has been described above. However, it may be determined whether the movement or the size change of the second image display area is necessary or unnecessary on the basis of the photographic subject other than the face of the person. Hereinafter, the example of the photographic subject (the main photographic subject) that is the standard when determining whether the movement or the size change of the second image display area is necessary or unnecessary is shown.

"Example of Main Photographic Subject"

FIG. 22 is a diagram illustrating an example of the main photographic subject used when the control unit 290 determines the movement or the size change of the second image display area in the fourth embodiment of the present technique. FIG. 22 shows a relationship between the main photographic subject 601 and the importance 602.

The main photographic subject 601 is a photographic subject that is the standard when determining whether the movement or the size change of the second image display area is necessary or unnecessary. For example, the face of the person is classified into children, women, and the other person. In addition, except for the face of the person, a moving object and a still object are used as the main photographic subject.

In addition, a main photographic detecting unit is provided instead of the face detecting unit 230 shown in FIG. 3, and the main photographic subject is detected by the main photographic subject detecting unit. In addition, as the method of detecting the main photographic subject, for example, similarly to the face detecting method, a detection method by matching of a template in which brightness distribution information for each main photographic subject is recorded and an actual image may be used. In addition, for example, a detection method of detecting each attribute (for example, children, women, and the other persons) by a weak distinguisher using a differential value of brightness between two points in a face image (for example, Japanese Unexamined Patent Application Publication No. 2009-118009). In addition, an object detecting method of detecting a specific object (human, animal, subway, vehicles, and the like) using gradient of brightness and a gradient direction (for example, Japanese Unexamined Patent Application Publication No. 2010-67102). In addition, in the focused object (still object), detection may be performed on the basis of the focus result of the AF process.

The importance 602 represents importance of the main photographic subject, and means that the importance gets higher as the numerical value gets higher.

For example, in FIG. 17, it is assumed that faces of two children are included in the first candidate area 511, a face of one woman and a face of one child are included in the second candidate area 512, and faces (for example, a dog and a cat) of two animals are included in the third candidate area 513. As described above, when the main photographic subject is included in any one of the first candidate area 511 to the third candidate area 513, the movement destination of the second image display area is determined on the basis of the sum value of the importance of the main photographic subject included in the candidate areas.

For example, the faces of two children are included in the first candidate area 511, and thus the sum value of the importance is 10 (=5×2). In addition, the face of one woman and the face of one child are included in the second candidate area 512, and the sum value of the importance is 9 (=5+4). In addition, the faces of two animals (for example, the dog and the cat) are included in the third candidate area 513, and thus the sum value of the importance is 4 (=2×2).

For this reason, the third candidate area 513 in which the sum value of the importance of the main photographic subject is lowest is determined as the movement destination of the second image display area.

In addition, even when the main photographic subject is included in the first candidate area 511 to the third candidate area 513, the candidate area in which the sum value of the importance is less than a predetermined value (for example, 3) may be determined as the movement destination of the second image display area.

5. Modification Example

In the first to fourth embodiment of the present technique, the example in which the second image display area is provided in the first image display area to display two images has been described. However, two images may be displayed in which the first image display area and the second image display area are different areas.

In the modification example, the example of displaying two images in the first image display area and the second image display area as the different areas is described. In addition, the configuration of the information processing apparatus in the modification example is substantially the same as the example shown in FIG. 1 to FIG. 3. For this reason, a part of the description of the part common with the first embodiment of the present technique is omitted.

"Disposition Example of First Image Display Area and Second Image Display Area"

FIG. 23 is a diagram illustrating a transition example of the PinP display displayed on the display unit 172 in the modification example of the present technique.

In FIG. 23, "a" shows a display example when the second image display area is provided in the first image display area. In addition, since "a" of FIG. 23 is the same as the example shown in "a" of FIG. 5, and the description herein is omitted.

In FIG. 23, "b" shows a display example (a display screen 700) when two images are displayed in two areas (the first image display area 701 and the second image display area 702) arranged to be adjacent. The image in the first image display area 701 corresponds to the image in the first image display area 311 shown in "a" of FIG. 23, and the image in the second image display area 702 corresponds to the image in the second image display area 312 shown in "a" of FIG. 23.

In addition, the display screen shown in "a" of FIG. 23 and the display screen shown in "b" of FIG. 23 can be sequentially changed by the user operation during the image capturing operation. For example, an operation member or a predetermined button on a touch panel provided on the outside face of the information processing apparatus 100 is used as a display switching button. Whenever the display switching button is pressed, it is possible to switch to each display screen shown in "a" of FIG. 23 and "b" of FIG. 23 as shown in FIG. 23 by the arrow.

In addition, in the modification example, the example of arranging the first image display area 701 and the second image display area 702 to be adjacent in the horizontal direction is described, but the disposition of the first image display area 701 and the second image display area 702 may be appropriately changed. For example, the disposition of the first display area 701 and the second image display area 702 may be changeable according to the user operation.

6. Modification Example

In the first to fourth embodiments, the example of displaying the frame on one image when setting the frame display mode, and displaying the image capturing range of the other image by the frame has been described. However, the image capturing range of the other image may be displayed according to a display shape other than the frame.

Therein, in the modification example, the example of displaying the image capturing range of the other image by the display shape other than the frame is described. In addition, the configuration of the information processing apparatus in the modification example is substantially the same as the example shown in FIG. 1 to FIG. 3. For this reason, a part of the description of the part common with the first embodiment of the present technique is omitted.

"Display Example at Time of Setting Frame Display Mode"

FIG. 24 is a diagram illustrating a transition example of the display screen displayed on the display unit 172 in the modification example of the embodiment of the present technique.

In "a" of FIG. 24, similarly to the first to fourth embodiments of the present technique, the example of displaying the frame 711 on the image in the first image display area 710. For example, as shown in "a" of FIG. 24, when the frame 711 is displayed by a dark color such as black when setting the frame display mode, the photographic subject of the background is hidden by the frame 711, and thus there is a worry that the photographic subject of the background is not easily recognized. Particularly, when the zoom magnification is high, the size of the frame 711 is small, and thus it is assumed that it is difficult to recognize the photographic subject in the frame 711.

In the modification example, the image capturing range is represented by a semi-transparent on-screen display (OSD), instead of displaying the frame. The display example is shown in "b" of FIG. 24 and "c" of FIG. 24.

In FIG. 24, "b" and "c" show the example of displaying the image capturing range (the image capturing range of the image generated using the second image capturing unit 112) by the semi-transparent on-screen display. Specifically, "b" of FIG. 24 shows an example in which the area 722 corresponding to the image capturing range (the image capturing range of the image generated using the second image capturing unit 112) is transparent, and the other area 721 is gray by the semi-transparent on-screen display, in the first image display area 720. In addition, "c" of FIG. 24 shows an example in which the area 732 corresponding to the image capturing range (the image capturing range of the image generated using the second image capturing unit 112) is gray by the semi-transparent on-screen display, and the other area 731 is transparent.

As described above, in the frame display mode, as a display shape representing the relationship between the image capturing range of the first image capturing unit 111 and the image capturing range of the second image capturing unit 112 with respect to the photographic subject, the image corresponding to the image capturing range of the second image capturing unit 112 in the first image and the other image may be different display shapes. The first image is the image generated using the first image capturing unit 111.

In addition, the image capturing range is represented, and thus it is possible to secure the visibility of the photographic subject. In addition, since there is a taste of the user for the visibility of the photographic subject, for example, it is possible to change the display by the semi-transparent on-screen display when setting the frame display mode, by the user operation. For example, the operation member provided on the outside face of the information processing apparatus 100 or a predetermined button on the touch panel is used as the display switching button. Whenever the display switching button is pressed, it is possible to switch to each display method shown in "a" of FIG. 24 to "c" of FIG. 24, as shown in FIG. 24 by the arrow. Accordingly, it is possible to further improve the visibility according to the taste of the user.

7. Modification Example

In the first to fourth embodiments, the example in which the information processing apparatus is provided with one display unit has been described. However, it is also assumed that one information processing apparatus is provided with a plurality of display units. In addition, it is assumed that the image generated by the information processing apparatus is displayed on the external device. Therein, in the modification example, an example of displaying the images using the plurality of display units or the external device is described.

"Example of Image Processing Device provided with Plurality of Display Units"

FIG. 25 is a diagram illustrating an external appearance configuration example of the information processing apparatus 800 in the modification example of the embodiment of the present technique. Specifically, the example in which one information processing apparatus (the information processing apparatus 800) is provided with two display units (the first display unit 811 and the second display unit 812) is shown.

In addition, "a" of FIG. 25 shows a display example corresponding to the time of setting the frame display mode in the first to fourth embodiments of the present technique, and "b" of FIG. 25 shows a display example corresponding to the time of setting the PinP display mode in the first to fourth embodiments. In addition, the information processing apparatus 800 is substantially the same as the information processing apparatus 100 shown in FIG. 1 to FIG. 3, except that two display units (the first display unit 811 and the second display unit 812) are provided. For this reason, hereinafter, the same reference numerals and signs as the units of the information processing apparatus 100 are given to the units of the information processing apparatus 800, and the description thereof is performed.

The first display unit 811 is a display unit that mainly displays a main screen on the basis of the control of the display control unit 260. In addition, the main screen is, for example, each screen described in the first to fourth embodiments of the present technique.

The second display unit 812 is a display unit that mainly displays a sub-screen on the basis of the control of the display control unit 260. In addition, the sub-screen is, for example, a subsidiary screen for displaying the content other than the content of the main screen.

For example, during the image capturing operation, when setting the frame display mode, as shown in "a" of FIG. 25, the image (the frame 815 is also displayed) can be displayed only on the first display unit 811.

In addition, for example, during the image capturing operation, when setting the PinP display mode, as shown in "b" of FIG. 25, the image that is the display target of the first image display area is displayed on the first display unit 811, and the image that is the display target of the second image display area can be displayed on the second display unit 812.

"Display Example when Image is Displayed on External Display Device"

FIG. 26 is a diagram illustrating an external appearance configuration example of the information processing apparatus 100 and the display device 850 in the modification example of the embodiment of the present technique. Specifically, an example in which the information processing apparatus 100 and the display device 850 are connected through an inter-device interface 860 is shown. As the inter-device interface 860, for example, an HDMI (High-Definition Multimedia Interface) cable may be used. In addition, as the inter-device interface 860, the other inter-device interface that connects the information processing apparatus 100 and the display device 850 by a cable or wireless, and in which the information processing apparatus 100 and the display device 850 can communicate with each other may be used.

In addition, "a" of FIG. 26 shows a display example corresponding to the time of setting the frame display mode in the first to fourth embodiments of the present technique, and "b" of FIG. 26 shows a display example corresponding to the time of setting the PinP display mode in the first to fourth embodiments of the present technique. In addition, the information processing apparatus 100 is substantially the same as the information processing apparatus 100 shown in FIG. 1 to FIG. 3.

The display device 850 is a display device capable of displaying the image (the image data) input from the information processing apparatus 100 through the inter-device interface 860 and a connection terminal (not shown) on the display unit 851.

In addition, the external interface 195 (shown in FIG. 2) outputs the images (the image data) generated using the first image capturing unit 111 and the second image capturing unit 112 to the display device 850 through the inter-device interface 860, and displays the output images on the display device 850. In this case, as shown in "a" of FIG. 26 and "b" of FIG. 26, it is possible to display different images of the display unit 172 and the display device 850. In addition, the same image of the display unit 172 and the display device 850 may be displayed. In addition, such a display method can be switched on the basis of the user operation.

For example, during the image capturing operation, when setting the frame display mode, as shown in "a" of FIG. 26, it is possible to display the image (the frame 870 is also displayed) only on the display unit 172.

In addition, for example, during the image capturing operation, when setting the PinP display mode, as shown in "b" of FIG. 26, the image that is the display target of the first image display area may be displayed on the display unit 172, and the image that is the display target of the second image display area may be displayed on the display device 850.

In addition, the image that is the display target of the second image display area may be displayed on the display unit 172, and the image that is the display target of the first image display area may be displayed on the display device 850. In addition, such a display method may be switched on the basis of the user operation.

As shown in FIG. 25 and FIG. 26, the first to fourth embodiments of the present technique may be applied to the information processing apparatus provided with the plurality of display units or the information processing apparatus connected to the other display device. In addition, the first image display area and the second image display area are different areas, it is possible to see the whole image in the first image display area when setting the PinP display mode, and it is possible to further improve the visibility.

In addition, in the embodiments of the present technique, the information processing apparatus provided with two image capturing units has been described, but the embodiments of the present technique may be applied to the information processing apparatus provided with three or more image capturing units.

In addition, the information processing apparatus provided with two image capturing units has been described by way of example, but the embodiments of the present technique may be applied the information processing apparatus to and from which the (one or more) image capturing unit is attachable and detachable. In addition, the embodiments of the present technique may be applied to an information processing apparatus such as an image capturing function mobile phone and an image capturing function mobile terminal device (for example, a smart phone).

In addition, the embodiments described above represent an example for embodying the present technique, and items in the embodiments and invention specific items in Claims have correspondence to each other. Similarly, the invention specific items in Claims and the items in the embodiments of the present technique to which the same name is given have correspondence to each other. However, the present technique is not limited to the embodiments, and may be embodied by various modifications of the embodiments in the scope which does not deviate from the main concept.

In addition, the process step described in the embodiments may be understood as a method having a series of steps, and may be understood as a program for causing a computer to execute the series of steps or a recording medium for storing the program. As the recording medium, for example, a CD (Compact Disc), an MD (MiniDisc), a DVD (Digital Versatile Disc), a memory card, a Blu-ray Disc (registered trademark), and the like may be used.

In addition, the present technique may take the following configurations.

(1) An information processing apparatus comprising: a processor that acquires first image data captured by a first image capturing unit; acquires second image data captured by a second image capturing unit; controls a display to operate in a first mode in which the first and second images are simultaneously displayed; controls the display to operate in a second mode in which a relationship of the second image with the first image is indicated; and selects between at least the first and second modes based on a predetermined condition.

(2) The information processing apparatus of (1), further comprising: the first and second image capturing units.

(3) The information processing apparatus of any of (1) to (2), wherein the first and second image capturing units are a single image capturing unit.

(4) The information processing apparatus of any of (1) to (3), further comprising: the display.

(5) The information processing apparatus of any of (1) to (4), wherein the processor generates a three-dimensional (3D) image based on the first and second image data.

(6) The information processing apparatus of any of (1) to (5), wherein the processor controls the display to display the second image data in an overlapping manner on the first image data when controlling the display to operate in the first mode.

(7) The information processing apparatus of any of (1) to (6), wherein the processor controls the display to display the first image data on an entirety of the display and the second image data an overlapping manner on a portion of the display that is less than the entirety of the display when controlling the display to operate in the first mode.

(8) The information processing apparatus of any of (1) to (7), wherein the first image capturing unit is set to a first zoom ratio and the second image capturing unit is set to a second zoom ratio.

(9) The information processing apparatus of any of (1) to (8), wherein the processor controls the display to display the first image data on an entirety of the display and the second image data an overlapping manner on a portion of the display that is less than the entirety of the display when controlling the display to operate in the first mode.

(10) The information processing apparatus of any of (1) to (9), wherein the processor controls the display to modify a size of the portion of the display in which the second image data is displayed when the second zoom ratio is modified.

(11) The information processing apparatus of any of (1) to (10), wherein the processor controls the display to display a graphic indicia on the first image data that represents a range of the second image data that is included in the first image data when controlling the display to operate in the second mode.

(12) The information processing apparatus of any of (1) to (11), wherein the processor controls the display to display a frame on the first image data that represents a range of the second image data included in the first image data when controlling the display to operate in the second mode.

(13) The information processing apparatus of any of (1) to (12), wherein the processor controls the display to display a predetermined effect to the first image data that represents a range of the second image data included in the first image data when controlling the display to operate in the second mode.

(14) The information processing apparatus of any of (1) to (13), wherein the processor controls the display to display a predetermined effect to the first image data that represents a range of the first image data that is not included in the second image data when controlling the display to operate in the second mode.

(15) The information processing apparatus of any of (1) to (14), wherein the first image capturing unit is set to a first zoom ratio and the second image capturing unit is set to a second zoom ratio.

(16) The information processing apparatus of any of (1) to (15), wherein the processor controls the display to change a size of the graphic indicia displayed on the first image data when the second zoom ratio is modified.

(17) The information processing apparatus of any of (1) to (16), wherein the predetermined condition corresponds to whether the first and second image data are moving image content or still image content.

(18) The information processing apparatus of any of (1) to (17), wherein the processor controls the display to operate in the second mode when the first and second image data are moving image content or the first image data is moving image content and the second image data is still image content.

(19) The information processing apparatus of any of (1) to (18), wherein the processor controls the display to operate in the first mode when the first and second image data are still image content.

(20) The information processing apparatus of any of (1) to (19), wherein the predetermined condition corresponds to a difference between the first zoom ratio and the second zoom ratio.

(21) The information processing apparatus of any of (1) to (20), wherein the processor controls the display to operate in the first mode when the difference is greater than a predetermined threshold value.

(22) The information processing apparatus of any of (1) to (21), wherein the processor controls the display to operate in the second display mode when the difference is less than the predetermined threshold value.

(23) The information processing apparatus of any of (1) to (22), wherein the predetermined condition corresponds to whether a size of a main photographic subject included in the second image data is greater than a size of the main photographic subject included in the first image data.

(24) The information processing apparatus of any of (1) to (23), wherein the processor detects a face from the first and second image data and identifies the face as the main photographic subject.

(25) The information processing apparatus of any of (1) to (24), wherein the processor controls the display to operate in the first mode when the size of the main photographic subject included in the second image data is greater than the size of the main photographic subject included in the first image data.

(26) The information processing apparatus of any of (1) to (25), wherein the processor controls the display to operate in the second mode when the size of the main photographic subject included in the second image data is not greater than the size of the main photographic subject included in the first image data.

(27) The information processing apparatus of any of (1) to (26), wherein the predetermined condition corresponds to whether a low power consumption mode is set, and the processor controls the display to operate in the second mode when the low power consumption mode is set.

(28) The information processing apparatus of any of (1) to (27), wherein the predetermined condition corresponding to an amount of battery power remaining, and the processor controls the display to operate in the second mode when the amount of battery power remaining is less than a predetermined threshold value.

(29) The information processing apparatus of any of (1) to (28), wherein the processor controls the display to display an animation when switching between the first and second modes.

(30) The information processing apparatus of any of (1) to (29), wherein the animation includes sequentially reducing a size of the second image data when switching between the second mode and the first mode.

(31) The information processing apparatus of any of (1) to (30), wherein the processor identifies a main photographic subject included in the first and second image data, and controls the display to display the second image data at a location overlapping the first image data that does not correspond to a position of the main photographic subject in the first image data when controlling the display to operate in the first mode.

(32) An information processing method comprising: acquiring first image data captured by a first image capturing unit; acquiring second image data captured by a second image capturing unit; controlling a display to operate in a first mode in which the first and second images are simultaneously displayed; controlling the display to operate in a second mode in which a relationship of the second image with the first image is indicated; and selecting between at least the first and second modes based on a predetermined condition.

(33) A non-transitory computer-readable medium including computer program instructions, which when executed by an information processing apparatus, cause the information processing apparatus to perform a process, the process comprising: acquiring first image data captured by a first image capturing unit; acquiring second image data captured by a second image capturing unit; controlling a display to operate in a first mode in which the first and second images are simultaneously displayed; controlling the display to operate in a second mode in which a relationship of the second image with the first image is indicated; and selecting between at least the first and second modes based on a predetermined condition.

REFERENCE SIGNS LIST

100, 800 INFORMATION PROCESSING APPARATUS
101 BUS
111 FIRST IMAGE CAPTURING UNIT
112 SECOND IMAGE CAPTURING UNIT
121 FIRST SIGNAL PROCESSING UNIT
122 SECOND SIGNAL PROCESSING UNIT
131 RESOLUTION CONVERSION UNIT
132 IMAGE COMPRESSING AND DECOMPRESSING UNIT
133 GRAPHIC ENGINE
140 ROM
150 ROM
160 CPU
171 DISPLAY UNIT CONTROLLER
172, 851 DISPLAY UNIT
181 INPUT CONTROL UNIT
182 OPERATION UNIT
185 SHUTTER BUTTON
191 REMOVABLE MEDIA CONTROLLER
192 REMOVABLE MEDIA
195 EXTERNAL INTERFACE
210 FIRST IMAGE GENERATING UNIT
220 SECOND IMAGE GENERATING UNIT
230 FACE DETECTING UNIT
240 OPERATION RECEIVING UNIT
250 BATTERY REMAINING AMOUNT DETECTING UNIT
260 DISPLAY CONTROL UNIT
270 RECORDING CONTROL UNIT
280 CONTENTS STORING UNIT
290 CONTROL UNIT
811 FIRST DISPLAY UNIT
812 SECOND DISPLAY UNIT
850 DISPLAY DEVICE
860 INTER-DEVICE INTERFACE

The invention claimed is:

1. An information processing apparatus comprising:
circuitry configured to
acquire first image data from a first image source;
acquire second image data from a second image source;
control a touchscreen display to operate in a first mode in which the first image data and the second image data are simultaneously displayed; and
control repositioning of the second image data relative to the first image data on the touchscreen display based on user operation of the touchscreen display; and
control display of an animation when the touchscreen display switches from operating in the first mode to operating in a second mode,
wherein the animation includes animating a reduction in size of the second image data as the second image data is translated from an initial position to a first position on the touchscreen display, and the second image data includes a cropped version of a subject of the first image data, and
in the case that the second image data overlaps a face in the first image data, other than a main subject, at the first position, the circuitry moves the second image data to a second position different from the first position, and the circuitry increases a size of an area in which the second image data is displayed after moving the second image data to the second position.

2. The information processing apparatus of claim 1, wherein the circuitry is further configured to: control the touchscreen display to operate in a second mode in which a relationship between the second image data and the first image data is indicated; and
select between at least the first and second modes based on a predetermined condition.

3. The information processing apparatus of claim 1, wherein the circuitry generates a three-dimensional (3D) image based on the first and second image data.

4. The information processing apparatus of claim 1, wherein the circuit controls the touchscreen display to display the second image data overlapping the first image data when in the first mode.

5. The information processing apparatus of claim 1, wherein the circuitry controls the touchscreen display to display the first image data on an entirety of the touchscreen display and the second image data overlapping the first image data on a portion of the touchscreen display that is less than the entirety of the touchscreen display when the touchscreen display is in the first mode.

6. The information processing apparatus of claim 1, wherein the first image source is a first image capturing unit, the second image source is a second image capturing unit, the first image capturing unit is set to a first zoom ratio, and the second image capturing unit is set to a second zoom ratio.

7. The information processing apparatus of claim 6, wherein the circuitry controls the touchscreen display to display the first image data on an entirety of the touchscreen display and the second image data overlapping the first image data on a portion of the touchscreen display that is less than the entirety of the touchscreen display when the touchscreen display is in the first mode.

8. The information processing apparatus of claim 7, wherein the circuitry controls the touchscreen display to modify a size in which the second image data is displayed when the second zoom ratio is modified.

9. The information processing apparatus of claim 2, wherein the circuitry controls the touchscreen display to display a graphic indicia on the first image data that represents a range of the second image data that is included in the first image data when the touchscreen display is in the second mode.

10. The information processing apparatus of claim 2, wherein the circuitry controls the touchscreen display to display a frame on the first image data that represents a range of the second image data included in the first image data when the touchscreen display is in the second mode.

11. The information processing apparatus of claim 2, wherein the circuitry controls the touchscreen display to display the first imaged data with a predetermined effect that represents a range of the second image data included in the first image data when the touchscreen display is in the second mode.

12. The information processing apparatus of claim 2, wherein the circuitry controls the touchscreen display to display the first image data with a predetermined effect that represents a range of the first image data that is not included in the second image data when the touchscreen display is in the second mode.

13. The information processing apparatus of claim 2, wherein the predetermined condition corresponds to whether the first and second image data are moving image content or still image content.

14. The information processing apparatus of claim 13, wherein the circuitry controls the touchscreen display to operate in the second mode when the first and second image data are moving image content or the first image data is moving image content and the second image data is still image content.

15. The information processing apparatus of claim 13, wherein the circuitry controls the touchscreen display to operate in the first mode when the first and second image data are still image content.

16. The information processing apparatus of claim 2, wherein the predetermined condition corresponds to a difference between a first zoom ratio and a second zoom ratio.

17. The information processing apparatus of claim 2, wherein the predetermined condition corresponds to whether a size of a main photographic subject included in the second image data is greater than a size of the main photographic subject included in the first image data.

18. The information processing apparatus of claim 17, wherein the circuitry detects a face from the first and second image data and identifies the face as a main photographic subject.

19. The information processing apparatus of claim 2, wherein the predetermined condition corresponds to whether a low power consumption mode is set, and the circuitry controls the touchscreen display to operate in the second mode when the low power consumption mode is set.

20. The information processing apparatus of claim 2, wherein the predetermined condition corresponding to an amount of battery power remaining, and the circuitry controls the touchscreen display to operate in the second mode when the amount of battery power remaining is less than a predetermined threshold value.

21. The information processing apparatus of claim 1, wherein the circuitry identifies a main photographic subject included in the first and second image data, and controls the touchscreen display to display the second image data at a location overlapping the first image data that does not correspond to a position of the main photographic subject in the first image data when the touchscreen display is in the first mode.

22. An information processing method comprising:

acquiring, with circuitry, first image data from a first image source;

acquiring, with the circuitry, second image data from a second image source;

controlling, with the circuitry, a touchscreen display to operate in a first mode in which the first image data and the second image data are simultaneously displayed; and controlling, with the circuitry, repositioning of the second image data relative to the first image data on the touchscreen based on user operation of the touchscreen; and controlling, with the circuitry, display of an animation when the touchscreen display switches from operating in the first mode to operating in a second mode, wherein the animation includes animating a reduction in size of the second image data as the second image data is translated from an initial position to a first position on the touchscreen display, and the second image data includes a cropped version of a subject of the first image data, and in the case that the second image data overlaps a face in the first image data, other than a main subject, at the first position, the second image data is moved to a second position different from the first position, and a size of an area in which the second image data is displayed is increased after moving the second image data to the second position.

23. A non-transitory computer-readable medium including computer program instructions, which when executed by circuitry, cause the circuitry to perform a process comprising:

acquiring first image data from a first image source;

acquiring second image data from a second image source;

controlling a touchscreen display to operate in a first mode in which the first image data and the second image data are simultaneously displayed; and controlling repositioning of the second image data relative to the first image data on the touchscreen display based on user operation of the touchscreen display; and controlling display of an animation when the touchscreen display switches from operating in the first mode to operating in a second mode, wherein the animation includes animating a reduction in size of the second image data as the second image data is translated from an initial position to a first position on the touchscreen display, and the second image data includes a cropped version of a subject of the first image data, and in the case that the second image data overlaps a face in the first image data, other than a main subject, at the first position, the second image data is moved to a second position different from the first position, and a size of an area in which the second image data is displayed is increased after moving the second image data to the second position.

24. The information processing apparatus of claim 1, wherein a touchscreen of the touchscreen display detects a contact or an approach of a finger of a user.

* * * * *